United States Patent
Guillorn et al.

(10) Patent No.: US 7,151,256 B2
(45) Date of Patent: Dec. 19, 2006

(54) VERTICALLY ALIGNED NANOSTRUCTURE SCANNING PROBE MICROSCOPE TIPS

(75) Inventors: Michael A. Guillorn, Knoxville, TN (US); Bojan Ilic, Ithaca, NY (US); Anatoli V. Melechko, Oak Ridge, TN (US); Vladimir I. Merkulov, Knoxville, TN (US); Douglas H. Lowndes, Knoxville, TN (US); Michael L. Simpson, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 18 days.

(21) Appl. No.: 10/716,770

(22) Filed: Nov. 19, 2003

(65) Prior Publication Data

US 2005/0103993 A1    May 19, 2005

(51) Int. Cl.
    G12B 21/02    (2006.01)
    G01N 13/16    (2006.01)
    G01B 5/28     (2006.01)
    G01B 7/34     (2006.01)

(52) U.S. Cl. .......... 250/306; 250/307; 73/105
(58) Field of Classification Search ........... 250/306
    See application file for complete search history.

(56) References Cited

U.S. PATENT DOCUMENTS 6,159,742 A * 12/2000 Lieber et al. ............ 436/164
6,649,431 B1   11/2003 Merkulov et al.
6,743,408 B1 *  6/2004 Lieber et al. ............ 423/447.1
2001/0051367 A1 * 12/2001 Kiang ........................ 435/182
2002/0084410 A1 *  7/2002 Colbert et al. .............. 250/306
2002/0117951 A1 *  8/2002 Merkulov et al. .......... 313/309
2003/0148577 A1    8/2003 Merkulov et al.
2004/0197909 A1   10/2004 McKnight et al.

OTHER PUBLICATIONS

"Scanning tunneling microscopy on rough surfaces: tip-shape-limited resolution" G. Reiss, J. Vancea, H. Wittmann, J. Zweck, and H. Hoffmann, J. Appl. Phys. 67, 1156 (1990).
"Scanning probe metrology" J. E. Griffith, D. A. Grigg, M. J. Vasile, P. E. Russell, and E. A. Fitzgerald J. Vac. Sci. Technol. A 10, 674 (1992).
"Characterization of scanning probe microscope tips for linewidth measurement" J. E. Griffith, D. A. Grigg, M. J. Vasile, P. E. Russell, and E. A. Fitzgerald, J. Vac. Sci. Technol. B 9, 3586 (1991).
"Scanning probe tip geometry optimized for metrology by focused ion beam ion milling" M. J. Vasile, D. Grigg, J. E. Griffith, E. Fitzgerald, and P. E. Russell J. Vac. Sci. Technol. B, 9, 3569 (1991).
"Scanning probe tips formed by focused ion beams" M. J. Vasile, D. A. Grigg, J. E. Griffith, E. A. Fitzgerald, and P. E. Russell, Rev. Sci. Instrum., 62, 2167 (1991).
"Formation of probe microscope tips in silicon by focused ion beams" M.J. Vasile, C. Biddick and H. Huggins. Appl. Phys. Lett., 64, 575 (1994).

(Continued)

Primary Examiner—Nikita Wells
(74) Attorney, Agent, or Firm—John Bruckner PC

(57) ABSTRACT

Methods and apparatus are described for cantilever structures that include a vertically aligned nanostructure, especially vertically aligned carbon nanofiber scanning probe microscope tips. An apparatus includes a cantilever structure including a substrate including a cantilever body, that optionally includes a doped layer, and a vertically aligned nanostructure coupled to the cantilever body.

47 Claims, 34 Drawing Sheets

OTHER PUBLICATIONS

"Sharpened electron beam deposited tips for high resolution atomic force microscope lithography and imaging" M. Wendel, H. Lorenz and J.P. Kotthaus, Appl/ Phys. Lett. 67, 3732 (1995).

"Mechanical properties of high-aspect-ratio atomic force microscope tips" G. Janchen, P. Hoffmann, A. Kriele, H. Lorenz, A.J. Kulik, and G. Dietler, Appl. Phys. Lett., 80, 4623 (2002).

"Carbon-nanotube tips for scanning probe microscopy: Preparation by a controlled process and observation of deoxyribonucleic acid" H. Nishijima, S. Kamo, S. Akita, Y. Nakayama, K.I. Hohmura, S.H. Yoshimura and K. Takeyasu, Appl. Phys. Lett. 74, 4061 (1999).

"$WS_2$ nanotubes as tips in scanning probe microscopy" A. Rothschild, S.R. Cohen, R. Tenne, Appl. Phys. Lett. 75, 4025 (1999).

"Growth and fabrication with single-walled carbon nanotube probe microscopy tips" C.L. Cheung, J.H. Hafner, T.W. Odom, K. Kim and C.M. Lieber, Appl. Phys. Lett, 76, 3136 (2000).

"Improved fabrication approach for carbon nanotube probe devices" R. Stevens, C. Nguyen, A. Cassel, L. Delzeit, M. Meyyappan and J. Han, Appl. Phys. Lett, 77, 3453 (2000).

"Carbon nanotube tip probes: stability and lateral resolution in scanning probe microscopy and application to surface science in semiconductors" C.V. Nguyen, K.J. Chao, R.M.D. Stevens, L. Delzeit and M. Meyyappan. Nanotechnology, 12, 363 (2001).

"Wafer scale production of carbon nanotube scanning probe tips for atomic force microscopy" E. Yenilmez, Q. Wang, R.J. Chen, D. Wang, and H. Dai, 80, 2225 (2002).

"Single-wall carbon nanotube atomic force microscope probes" E.S. Snow, P.M. Campbell and J.P. Novak, Appl. Phys. Lett. 80, 2002.

"Catalytic growth of carbon filaments" R. T. K. Baker, Carbon, 27, 315 (1989).

"Patterned growth of individual and multiple vertically aligned carbon nanofibers" V. I. Merkulov, D. H. Lowndes, Y. Y. Wei, G. Eres, and E. Voelkl , Appl. Phys. Lett., 76, 3555 (2000).

"Shaping carbon nanostructures by controlling the synthesis process" V. I. Merkulov, M. A. Guillom, D. H. Lowndes, M. L. Simpson, and E. Voelkl, Appl. Phys. Lett., 79, 1178 (2001).

"Sharpening of carbon nanocone tips during the synthesis process" V. I. Merkulov, A. V. Melechko, M. A. Guillom, D. H. Lowndes, and M. L. Simpson, Chem. Phys. Lett., 350, 381 (2001).

"Controlled alignment of carbon nanofibers in a large-scale synthesis process" V. I. Merkulov, A. V. Melechko, M. A. Guillom, D. H. Lowndes, and M. L. Simpson, Appl. Phys. Lett. 80, 4816 (2002).

"Microfabricated field emission devices using carbon nanofibers as cathode elements" M.A. Guillom, A.V. Melechko, L.R. Baylor, V. I. Merkulov, E.D. Ellis, G.J. Bordonaro, M. L. Simpson and D.H. Lowndes, J. Vac. Sci. Technol. B 19, 2598 (2001).

"Self-aligned gated field emission devices using single carbon nanofiber cathodes" M. A. Guillom, A. V. Melechko, V. I. Merkulov, D. K. Hensley, M. L. Simpson, and D. H. Lowndes, Appl. Phys. Lett. 81, 3660 (2002).

"Individually addressable vertically aligned carbon nanofiber-based electrochemical probes" M.A. Guillom, A.V. Melechko, T.E. McKnight, D.W. Austin, V.I. Merkulov, M.L. Simpson and D.H. Lowndes, J. Appl. Phys. 91, 3824 (2002).

\* cited by examiner

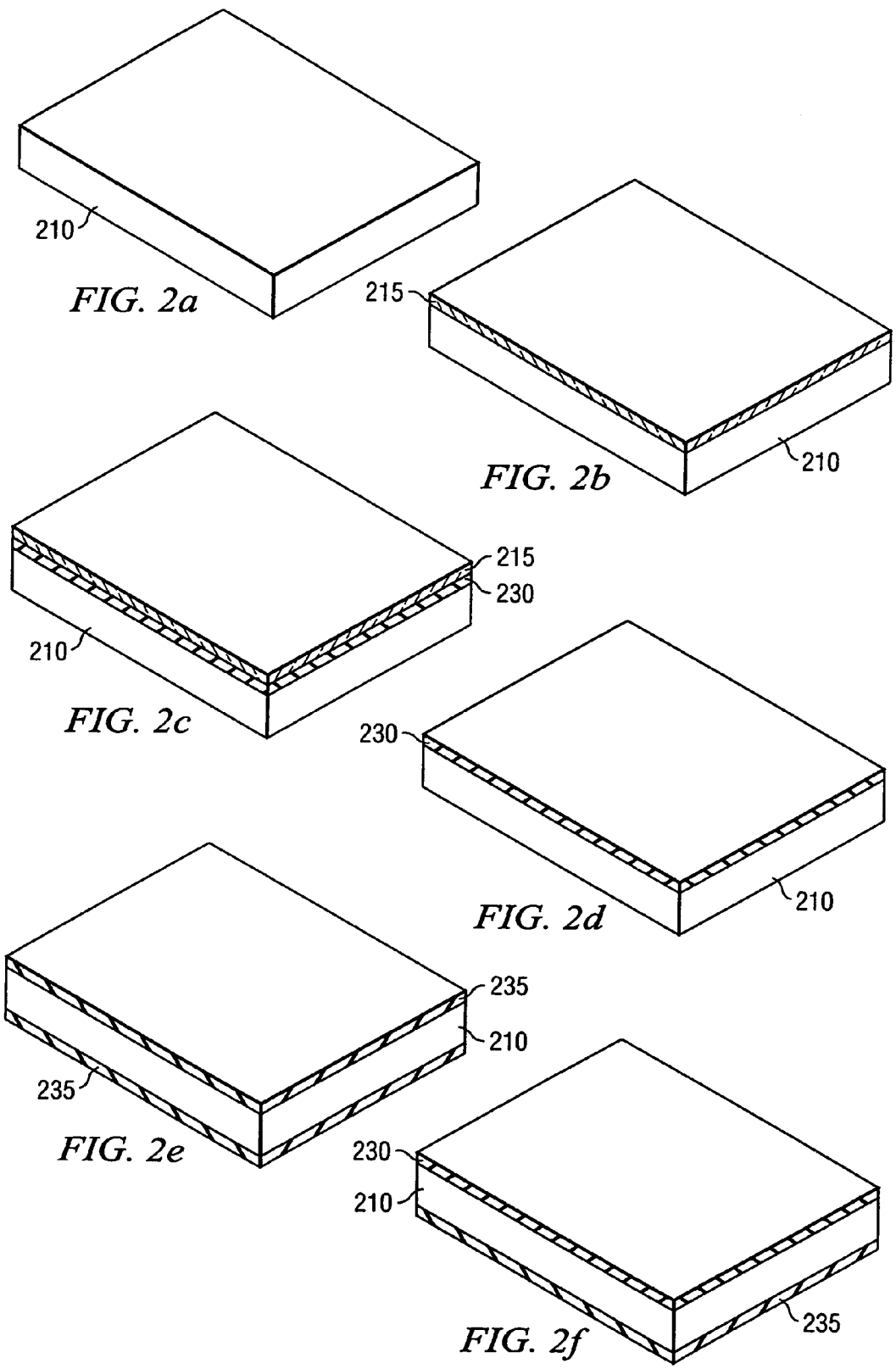

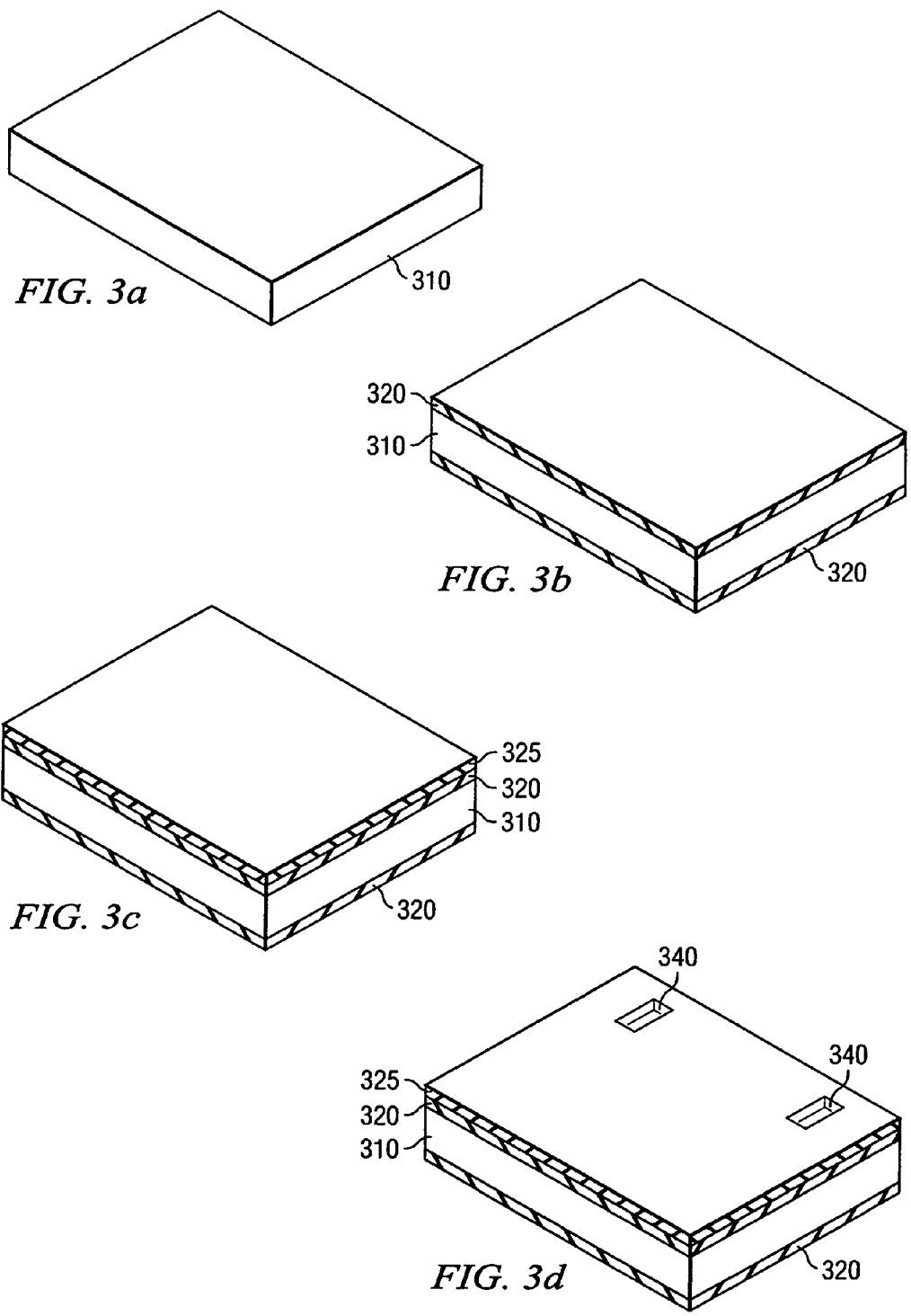

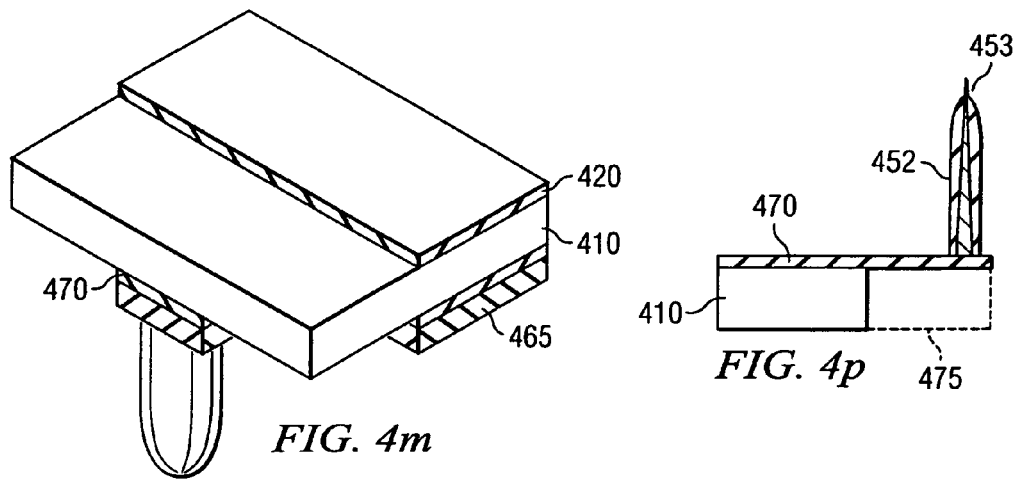
FIG. 4m
FIG. 4p
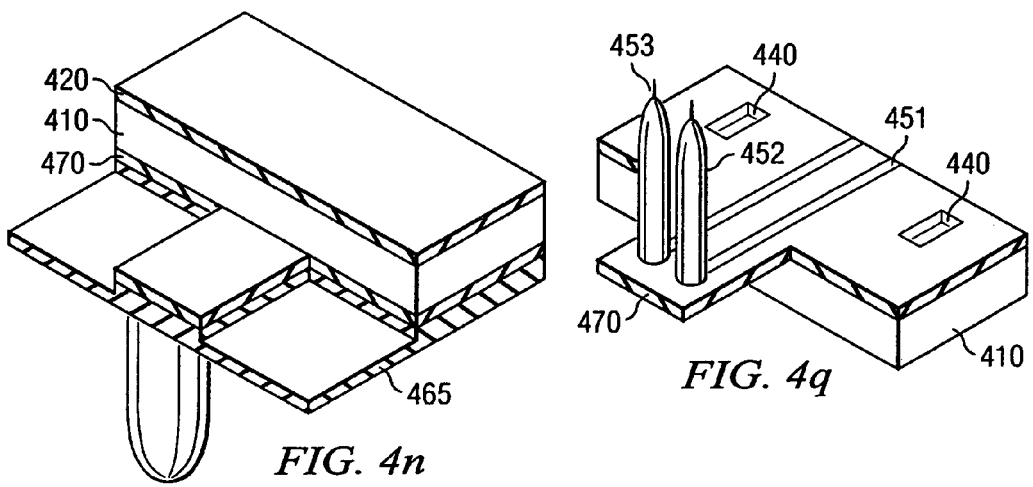
FIG. 4n
FIG. 4q
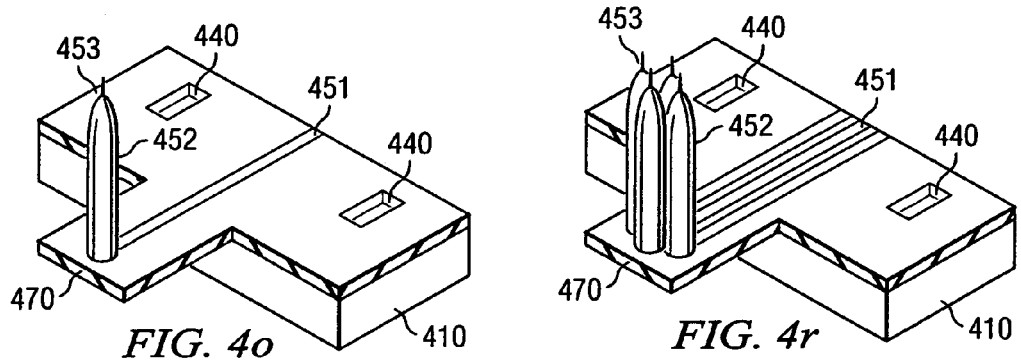
FIG. 4o
FIG. 4r

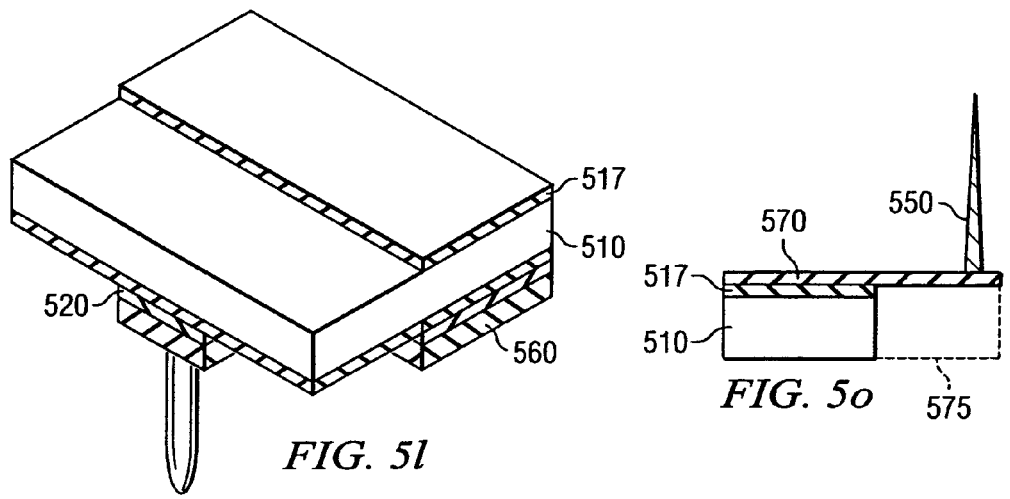
FIG. 5l
FIG. 5o
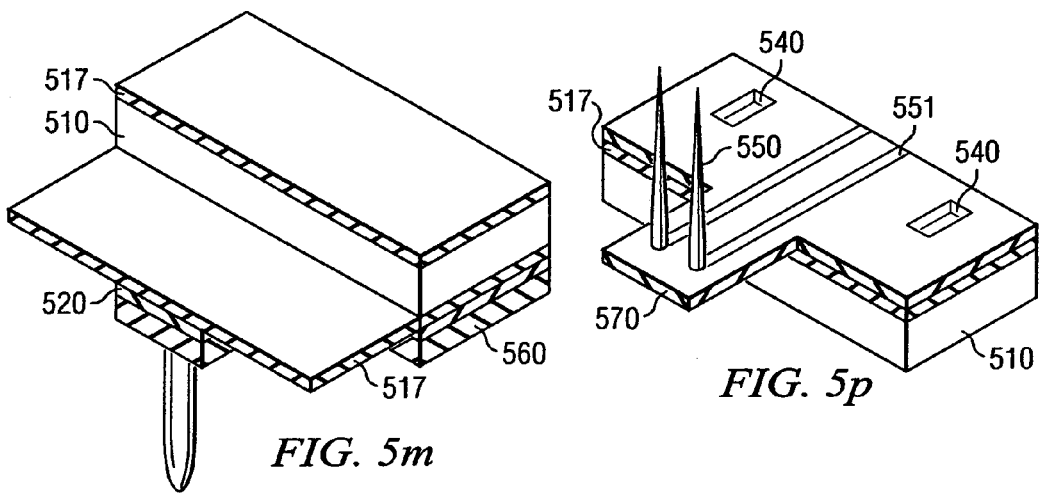
FIG. 5m
FIG. 5p
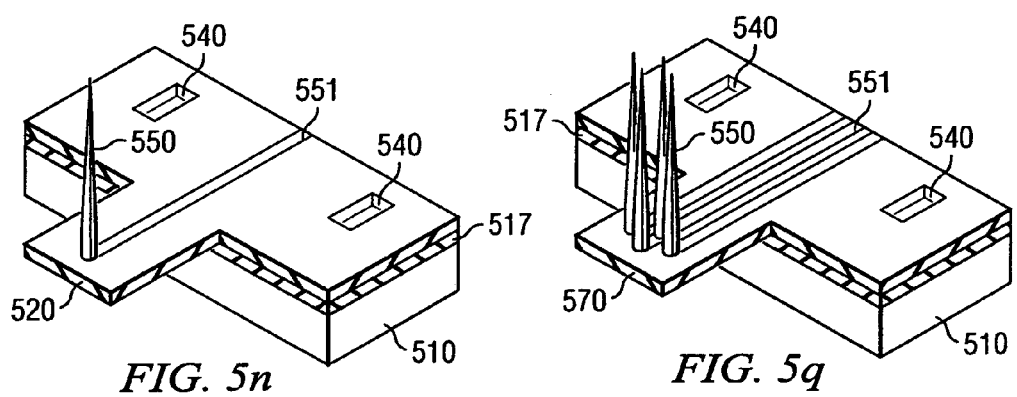
FIG. 5n
FIG. 5q

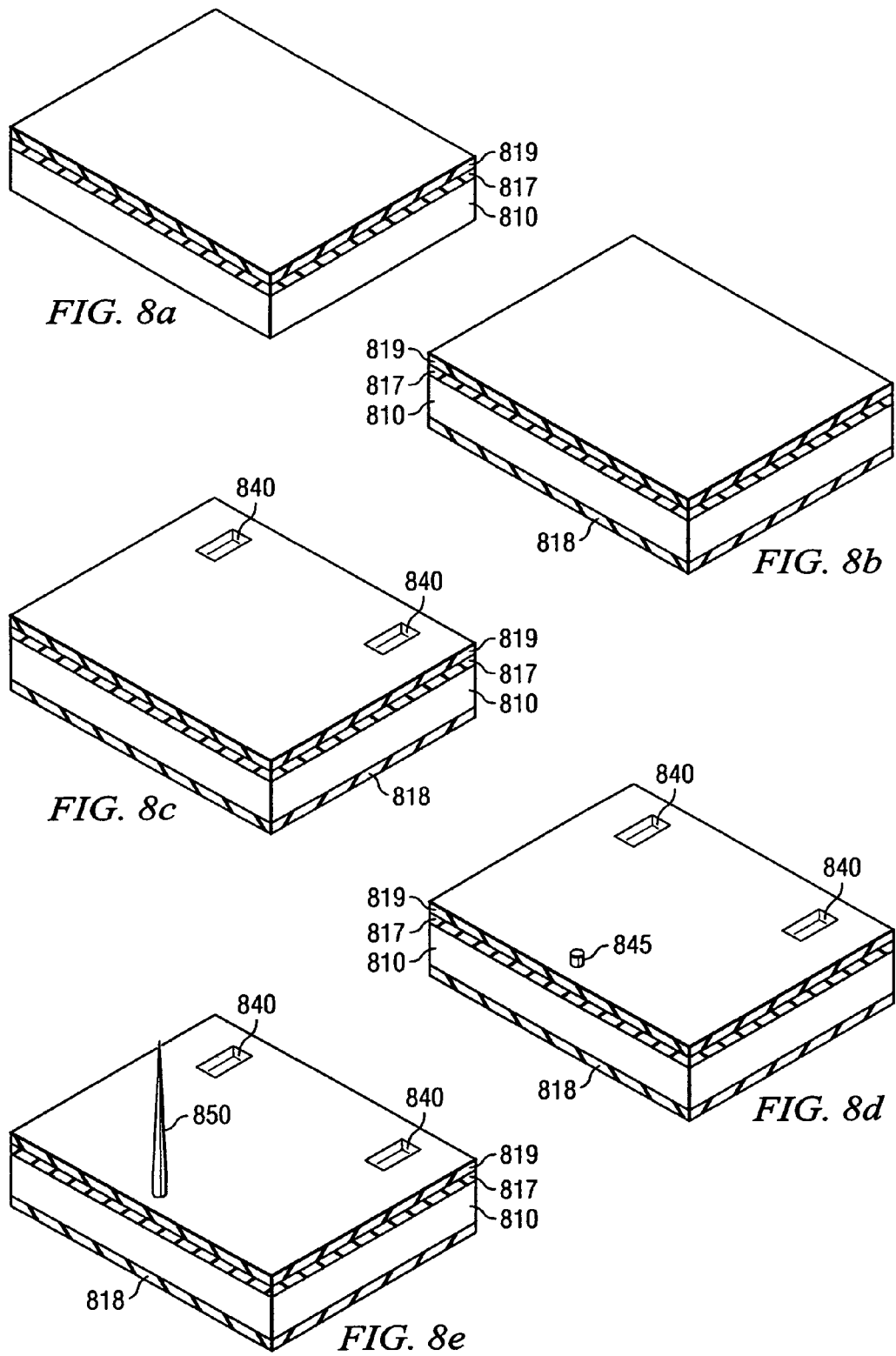

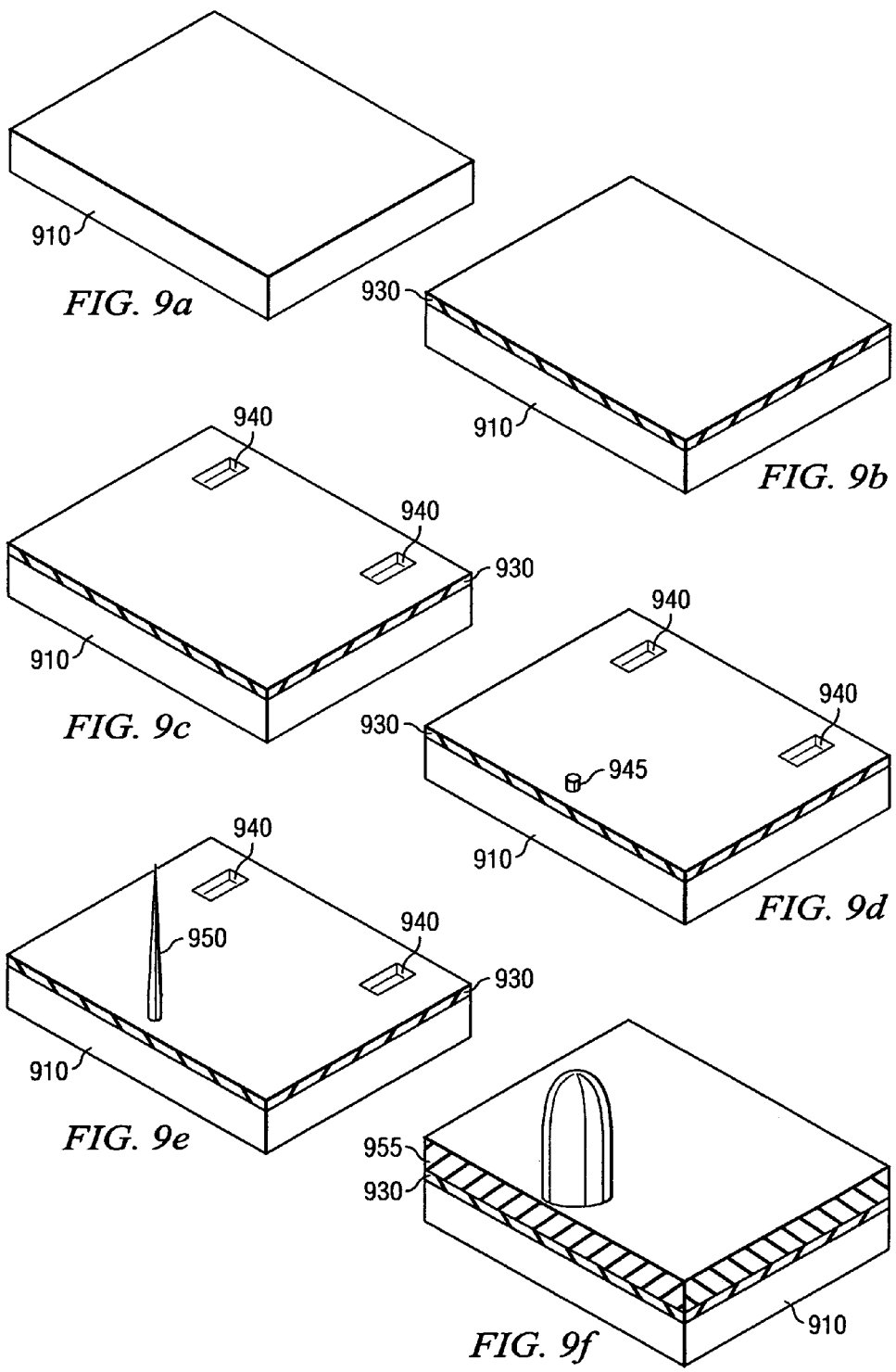

VERTICALLY ALIGNED NANOSTRUCTURE SCANNING PROBE MICROSCOPE TIPS

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND OF THE INVENTION

1. Field of the Invention

The invention relates generally to the field of nanotechnology. More particularly, the invention relates to cantilever structures that include a vertically aligned nanostructure and procedures for making a cantilever structure with a vertically aligned nanostructure. Specific embodiments of the invention are directed to scanning probe microscope tips and procedures for making scanning probe microscope tips.

2. Discussion of the Related Art

Scanning probe microscopy (SPM) has become an indispensable tool for the analysis of surfaces and the exploration of general substrate morphology at the nano- and microscale. Moreover, SPM techniques have been used to investigate a wide variety of material properties beyond substrate topography. These uses include the mapping of magnetic domains within a material (magnetic force microscopy, MFM), the mapping of chemical properties on a sample surface (chemical force microscopy, CFM), the electrochemical properties of surface (electrochemical microscopy, ECM) the manipulation of materials at the nanoscale and high-resolution nanolithography, among others. These applications span a vast array of scientific disciplines ranging from solid state physics to biology, environmental science to polymer engineering. High resolution SPM systems can be procured, operated and maintained at a fraction of the cost of other high resolution microscopy instruments (e.g. scanning electron and transmission electron microscopes) making it, perhaps, one of the most cost effective scientific tools available to the modern researcher.

High aspect ratio SPM tips are necessary to accurately characterize microscopic surfaces with nanoscale features. It has long been understood that the tip geometry of the scanning probe becomes convolved with the sample topography during imaging [1,2]. This can generate several artifacts that obscure important features of a samples' surface structure. Micro- and nanofabricated structures as well as complex biological systems posses a varied surface topography and can only be imaged effectively using this type of tip. Moreover, a small tip cross section ensures negligible variations in contact radius despite wearing of the tip's end during scanning and reduces the interaction force between tip and sample.

There are currently three methods used for producing high aspect ratio tips for SPM applications: ultrasharp Si or W tips [2–6], focused electron beam deposited amorphous carbon tips [7–9] and carbon nanotube (CNT) tips [10–22]. While all three of these types of tips offer significant improvements over traditional etched Si tips, each suffer from several key disadvantages which limit their usefulness and/or their ability to be produced in a large scale process. For example, ultrasharp Si tips are typically produced using focused ion beam milling. This is a serial process capable of only fabricating a single tip at a time. While this process can be automated with a high degree of precision it is time consuming and results in a tip that is very brittle that degrades easily. Focused electron beam deposited amorphous carbon tips are more mechanically robust than high aspect ratio Si tips. Unfortunately, the fabrication process is also serial in nature; only a single tip can be fabricated at a time.

CNT-based tips have been touted as the ultimate solution to the problem of manufacturing high aspect ratio SPM tips. Single walled CNT material has a diameter on the order of 1 nm and can be up to hundreds of microns long producing a structure that is intrinsically very high aspect ratio. Much work has been done on the integration of CNT growth with Si SPM tips to form hybrid supertips. Dai et al have demonstrated the ability to produce these tips on a wafer scale [21]. However, the control over the length and angle of the CNT protrusion from the Si tip is a significant problem. In a recent work by Snow et al it was shown theoretically and experimentally that CNT tips produced in this manner do not represent a significant improvement in imaging performance over other types of high aspect ratio tips [22]. They found that nonvertical alignment of the CNT tip with respect to the cantilever body caused the probe to bend in response to the surface-nanotube interaction forces during imaging. For long nanotubes, this elastic response rendered the tips unsuitable for imaging. For short nanotubes stable imaging was achieved using a small cantilever vibration amplitude. However, the bending response was found to be enhanced on highly textured surfaces limiting the ability to image nonplanar features. While a method by Dai has been demonstrated for shortening CNT tips to a suitably short length for controllable imaging this reduces their production to a serial process. It should also be noted that this offers no way to correct for variations in the alignment of the CNT with respect to the supporting Si tip. These facts combined with the results reported by Snow clearly shows that CNT-based SPM tips are not the ideal solution to this problem. A means of producing high aspect ratio tips that can simultaneously meet the following criteria is desperately needed: it must be mechanically robust, composed of a wear resistant material, created at a controlled angle with respect to the cantilever structure that it is attached to and be integrated into a wafer scale batch fabrication process.

Catalytically grown carbon fibers have been investigated for decades beginning in 1950's [23]. Chen et al. showed that carbon nanofibers (CNF) could be aligned perpendicular to the substrate in a direct current (DC) plasma enhanced chemical vapor deposition (PECVD) process [24]. Since that time a number of studies on the growth and properties of vertically aligned CNF (VACNF) have been conducted.

SUMMARY OF THE INVENTION

There is a need for the following aspects of the invention. Of course, the invention is not limited to these aspects.

According to an aspect of the invention, a process comprises: fabricating a cantilever structure having a vertically aligned nanostructure including: forming a doped layer at a first side of a substrate; depositing an etch mask layer on a second side of the substrate; forming a plurality of alignment marks that are coupled to the first side of the substrate; depositing a catalyst nanoparticle at a deterministic site that is coupled to the doped layer; growing the vertically aligned nanostructure at the deterministic site with the catalyst nanoparticle; depositing a first protective layer that surrounds at least a portion of the vertically aligned nanostructure; patterning the first protective layer to define an outline of a cantilever body; transferring the outline of the cantilever body from the first protective layer into the doped layer to form the cantilever body from the doped layer; depositing a second protective layer that coats at least a portion of a surface of the cantilever body; patterning the etch mask layer to define an outline of a relieved volume; transferring the outline of the relieved volume from the etch mask layer into the second side of the substrate to remove the relieved volume from the substrate, wherein the cantilever body is substantially not removed. According to another aspect of the invention, a manufacture comprises: a cantilever structure including: a substrate including a cantilever body that includes a doped layer; and a vertically aligned nanostructure coupled to the cantilever body.

According to another aspect of the invention, a process comprises: fabricating a cantilever structure having a vertically aligned nanostructure including: depositing a cantilever body layer that is coupled to a first side of a substrate; depositing an etch mask layer on a second side of a substrate; forming a plurality of alignment marks that are coupled to the first side of the substrate; depositing a catalyst nanoparticle at a deterministic site that is coupled to the cantilever body layer; growing the vertically aligned nanostructure at the deterministic site with the catalyst nanoparticle; depositing a first protective layer that surrounds at least a portion of the vertically aligned nanostructure; patterning the first protective layer to define an outline of a cantilever body; transferring the outline of the cantilever body from the first protective layer into the cantilever body layer to form the cantilever body from the cantilever body layer; depositing a second protective layer that coats at least a portion of a surface of the cantilever body; patterning the etch mask layer to define an outline of a relieved volume; transferring the outline of the relieved volume from the etch mask layer into the second side of the substrate to remove the relieved volume from the substrate, wherein the cantilever body is substantially not removed. According to another aspect of the invention, a manufacture comprises: a cantilever structure including: a substrate including a cantilever body; and a vertically aligned nanostructure coupled to the cantilever body.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals (if they occur in more than one view) designate the same elements. The invention may be better understood by reference to one or more of these drawings in combination with the description presented herein. It should be noted that the features illustrated in the drawings are not necessarily drawn to scale.

FIGS. 8A–8M illustrate schematic views of a process, representing an embodiment of the invention.

FIGS. 9A–9J illustrate schematic views of a process, representing an embodiment of the invention.

DESCRIPTION OF PREFERRED EMBODIMENTS

Figure 1A:
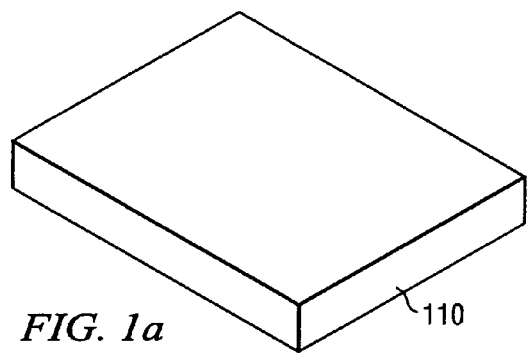
FIGS. 1A–1P illustrate schematic views of a process, representing an embodiment of the invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals within brackets. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. patent, and U.S. patent applications disclose embodiments that are useful for the purposes for which they are intended. The entire contents of U.S. Pat. No. 6,649,431, issued Nov. 18, 2003 entitled "Method for Mass Production of Carbon Tips with Cylinder-on-Cone Shape" to V. I. Merkulov, D. H. Lowndes, M. A. Guillorn, and M. L. Simpson are hereby expressly incorporated by reference herein for all purposes. The entire contents of U.S. patent application U.S. Ser. No. 10/068,795, filed Feb. 6, 2003, publication number 20030148577A1, publication date Aug. 7, 2003 (PCT/US03/03387, filed Feb. 5, 2003) entitled "Controlled Alignment of Catalytically Grown Nanotrsuctures in a Large-Scale Synthesis Process" by V. I. Merkulov, A. V. Melechko, M. A. Guillorn, D. H. Lowndes, and M. L. Simpson are hereby expressly incorporated by reference herein for all purposes. The entire contents of U.S. patent application U.S. Ser. No. 10/408,294, filed Apr. 7, 2003 entitled "Parallel Macromolecular Delivery and Biochemical/Electrochemical Interface to Whole Cells Employing Carbon Nanofibers" by T. E. McKnight, A. V. Melechko, G. D. Griffin, M. A. Guillorn, V. L. Merkulov and M. L. Simpson are hereby expressly incorporated by reference herein for all purposes.

VACNF can be synthesized in a completely deterministic manner using a catalytic DC plasma enhanced chemical vapor deposition process [25–30]. Features such as the location, length, tip diameter, shape, orientation (alignment) and chemical composition of VACNFs can be precisely controlled during the synthesis process. Vertically aligned can be defined as directed out of plane of the substrate. VACNF can be aligned in an arbitrarily defined (selected, deterministically) direction controlled by the electric field lines during PECVD growth. Thus, VACNF can be aligned at an angle ranging from normal to the plane of the substrate (90°) to approaching the plane of the substrate (>0°)Functional microfabricated device structures have been fabricated that exploit both the electrical and mechanical properties of single and multiple VACNF. Applications including robust microfabricated field emission electron sources [31, 32], nanoscale electrochemical probes [33] and the physical delivery of macromolecular material to living cells have been demonstrated [34]. These structures have been fabricated on whole 100 mm diameter Si, Si-on-insulator (SOI) and quartz wafers.

The use of the term VACNF can be generic for substantially vertically aligned nanostructures. These nanostructures can include carbon as well as other elemental/molecular materials, for example, as dopants. In addition to nanofibers, these nanostructures can include nanotubes, for instance, single wall nanotubes and multi-wall nanotubes.

The inventors have discovered that VACNFs satisfy very well the need for high aspect ratio SPM tips. In addition to meeting this need, VACNFs offer a number of other features that allow VACNFs to surpass all other materials presently used in SPM tip manufacturing. These features will be described in more detail below.

The invention can include methods for fabricating cantilever structures with deterministically grown VACNF tips suitable for a variety of SPM imaging applications. These methods can be implemented to make multiple individual cantilever structures that include a substantially vertically aligned (with respect to a plane of the cantilever body) elongated nanostructure at a wafer scale level batch fabrication processes.

The invention can include the fabrication of high aspect ratio scanning probe microscope (SPM) tips based on vertically aligned carbon nanofibers (VACNF). The inventive methods of making cantilever structures that include a VACNF disclosed in this application have a multiplicity of advantages. The VACNF can be synthesized completely deterministically in a wafer level batch fabrication process. Deterministically can be defined to mean that the location, angle, shape and/or composition of the nanostructures can be accurately and precisely controlled and/or reproduced, especially in a mass production context. This allows for thousands of identical tips to be fabricated simultaneously in precise locations with total control over their morphology. No other known technique for the production of high aspect ratio SPM tips can be implemented in a batch fabrication process.

The example processes disclosed in this document represent several of the multiplicity of ways to fabricate high aspect ratio SPM tips in a wafer scale batch process using VACNF, or any other material, that requires no post fabrication processing (i.e. focused ion beam milling or tip shortening as demonstrated in [21]).

The catalytic growth process enables the VACNF to be grown from any material compatible with a PECVD (plasma enhanced chemical vapor deposition) process that can be used for VACNF growth. This provides a way to fabricate high aspect ratio tips on any type of cantilever body including Si, $Si_3N_4$, or any other material compatible with a DC (and/or radio-frequency (RF) capacitively and/or inductively coupled) PECVD VACNF growth process.

A VACNF can be composed of nanostructured graphitic carbon layers similar to multi-walled nanotubes. This material has been shown to be mechanically stable and wear resistant.

Typically, a VACNF is electrically conductive, allowing it to be used for such SPM modes as electric force microscopy (EFM) and electrochemical surface modification.

The catalyst material used to nucleate the growth of the VACNF can be ferromagnetic, for example, Ni, Fe, Co or an alloy of two or three of these. This catalyst material can form a particle that rides on the tip of the fiber during the growth process. In this case, when the growth is terminated, a single crystal magnetic nanoparticle remains embedded in the tip of the VACNF, which is covered with a thin layer of graphitic carbon. This advantageously gives such a VACNF an intrinsic sensitivity to magnetic fields that is very useful for magnetic force microscopy applications.

For magnetic force microscopy, the catalytic particle at the tip should be ferromagnetic or superparamagnetic (due to reduced dimensions). Also if undesired (for example, for AFM imaging of magnetic surfaces), the catalytic particles can be removed from the tips after growth of the VACNFs by a short RIE etch in oxygen plasma followed by a 1 minute dip in nitric acid.

The surface chemistry of the VACNF can be modified by the incorporation of nitrogen containing gaseous species during the growth. This enables the synthesis of hydrophobic or hydrophilic VACNF. A wide range of surface chemistries exists for functionalizing macroscopic carbon fibers that work equally well on VACNF. By removing the carbon layer that coats the nanoparticle at the tip of the VACNF, chemical modification restricted to the tip region is possible. This should facilitate the use of VACNF in CFM applications.

Any lithography process capable of printing features of the required resolution for the catalyst site could be substituted during the appropriate processing steps enumerated above. This may include other types of photolithography or a charged particle based lithography such as electron beam lithography. It should also be noted that the process could be performed by first blanket coating the wafer with the desired metallization and exposing the inverse of the dot pattern (i.e. use a brightfield mask). The pattern could be transferred using any etching technique capable of removing the excess metal film without altering the dimensions of the catalyst site pattern. The growth process for the VACNFs discussed in this document need not be restricted to DC PECVD. Other types of PECVD processes may be used including RF, microwave, or electron cyclotron resonance (ECR).

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Figure 1B:
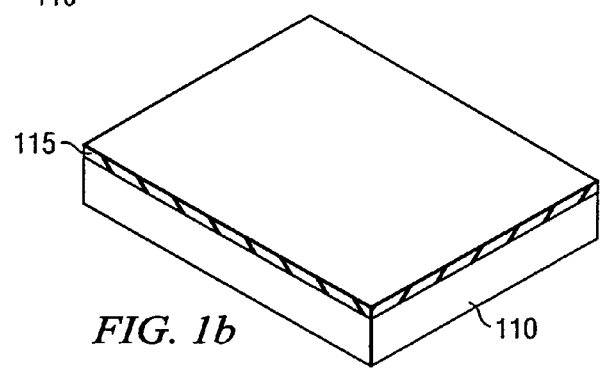
Figure 1C:
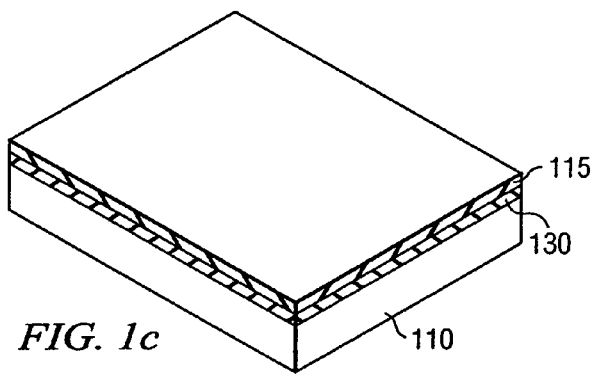
Figure 1D:
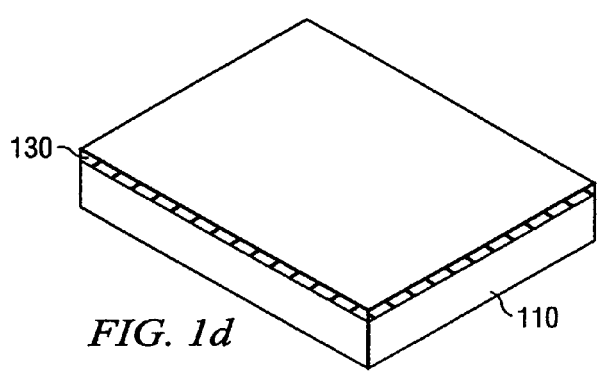
Figure 1E:
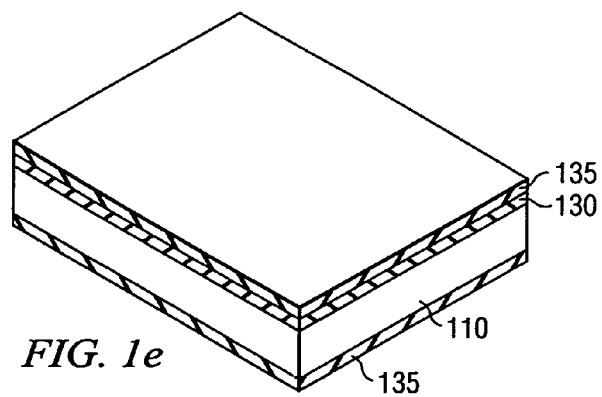
Figure 1F:
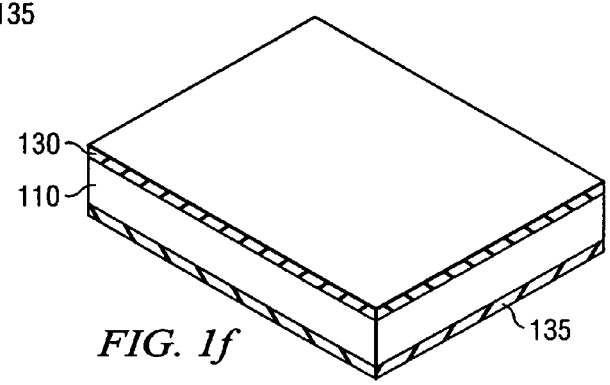
Figure 1G:
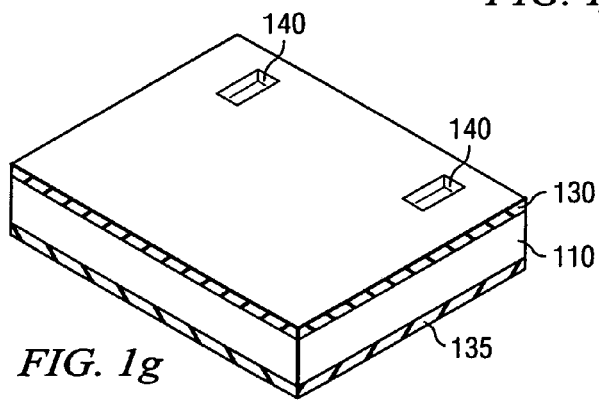
Figure 1H:
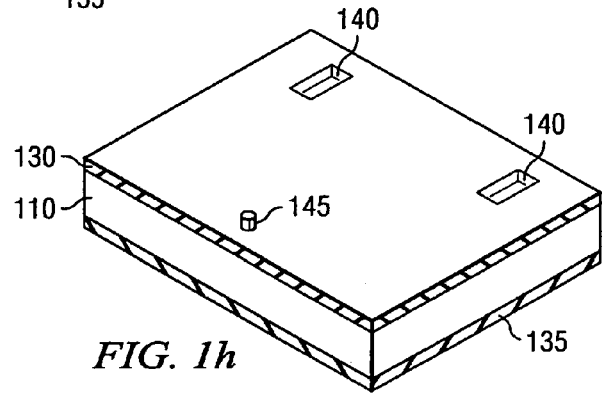
Figure 1I:
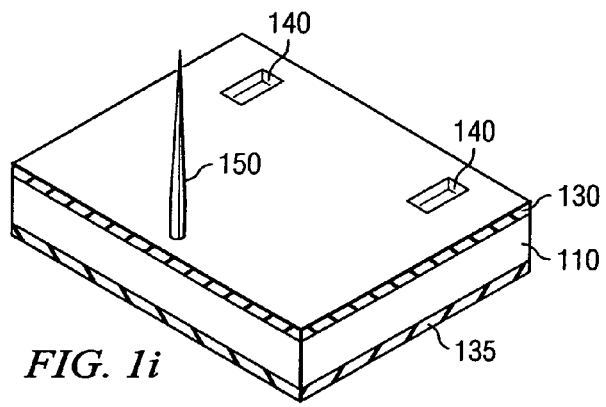
Figure 1J:
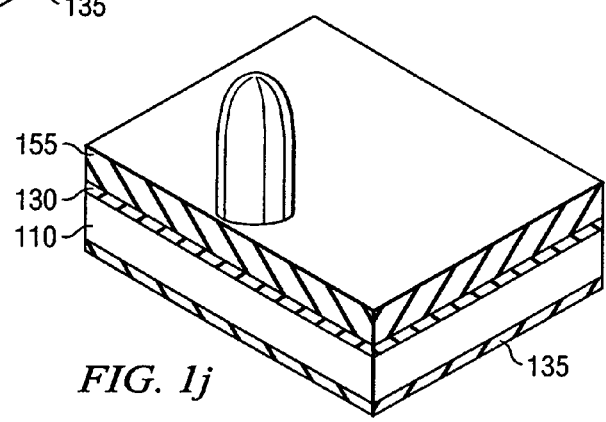
Figure 1K:
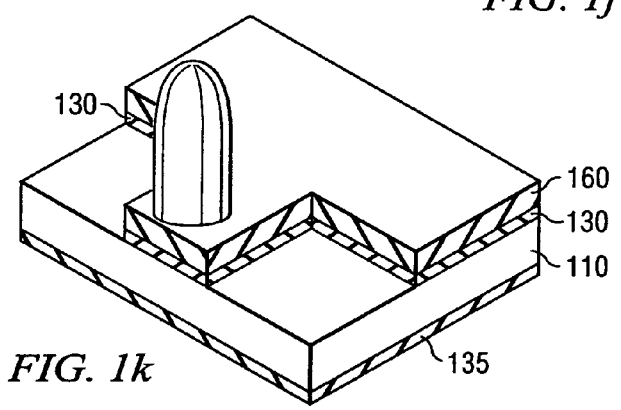
Figure 1L:
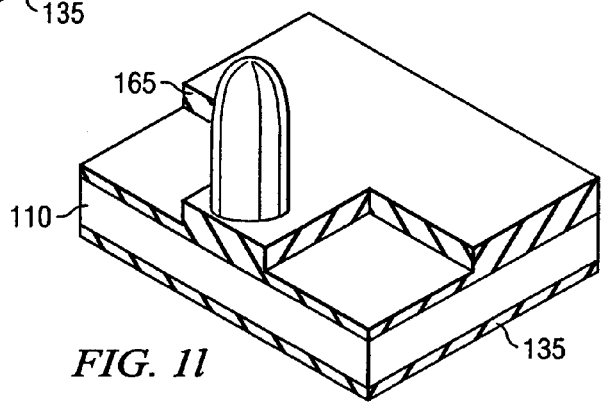
Figure 1M:
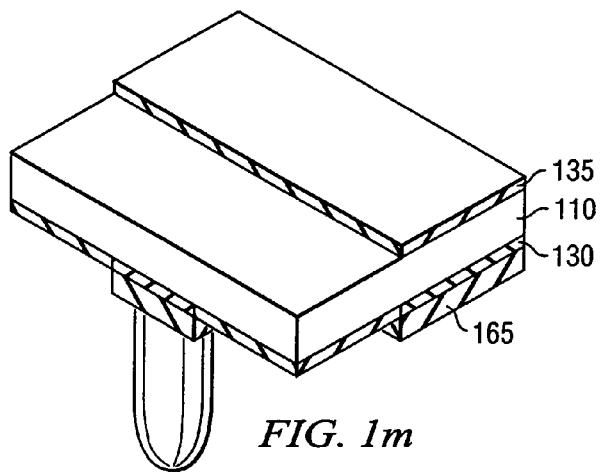
Figure 1N:
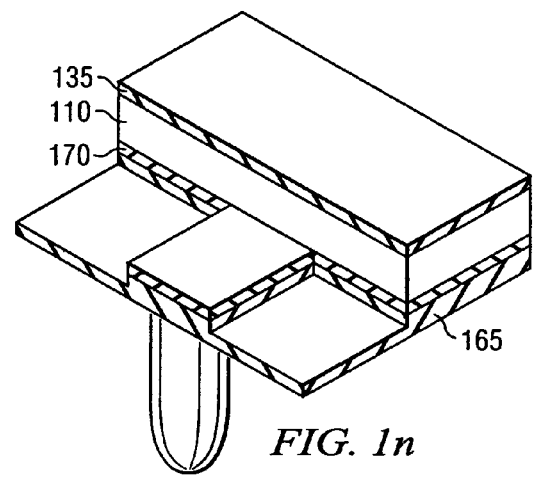
Figure 1O:
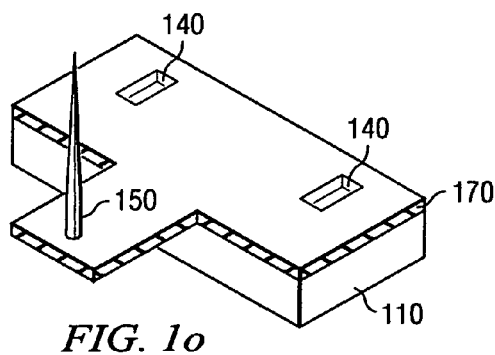
Figure 1P:
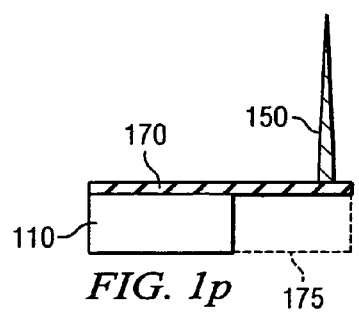

This example is a Si based process for producing high aspect ratio VACNF SPM tips on Si cantilevers using KOH for a through-wafer etch. Whole 4" intrinsic <100> Si double side polished wafers 110 are used as the substrate as shown in FIG. 1A. A highly doped p-type ($p^+$) region 130 several microns deep is formed on the surface of the wafers. The depth of this layer will determine the thickness of the final cantilever structure and, ultimately, the resonant frequency of the cantilever. This doping can be accomplished using a variety of techniques. In this example, a spin-on dopant (SOD) technique based on a spin-on borosilicate glass (BSG) is depicted. After curing the SOD layer 115 at 170° C. for 1 minute (the result of this sub-process is shown in FIG. 1B), the wafers are placed in an annealing furnace operated at 1100° C. The amount of time determines the depth of the doped region 130. For a 5 μm deep $p^+$ region, an annealing time of 5–6 hours is required (the result of this sub-process is shown in FIG. 1C). The SOD layer is removed from the wafers using a solution of diluted HF (the result of this sub-process is shown in FIG. 1D). This process is followed by the deposition of a 200 nm thick layer of $Si_3N_4$ 135 onto both sides of the wafers using low pressure chemical vapor deposition (LPCVD) (the result of this sub-process is shown in FIG. 1E). This layer will serve as an etch mask for the back side of the wafer in a subsequent processing step. The $Si_3N_4$ is stripped from the front side of the wafers to permit further processing of the underlying Si (the result of this sub-process is shown in FIG. 1F). A layer of photoresist is spin cast onto the wafers and an alignment mark pattern 140 is exposed. The type of exposure equipment used for this step is not critical. This example uses an optical i-line 5×reduction step and repeat (stepper) system. The pattern 140 includes of alignment marks for the stepper and a double-sided contact aligner. Following development, the pattern 140 is transferred into the substrate using reactive ion etching (RIE). This can be performed using any type of etching equipment capable of anisotropic etching of Si. The example uses a $CF_4$ based process in a parallel plate reactive ion etching apparatus. Following this etch, the photoresist was removed from the wafers using a combination of wet chemistry and an $O_2$-based downstream plasma system, referred to more commonly as ashing (the result of this sub-process is shown in FIG. 1G). The deposition of the catalyst nanoparticles will now be described. Photoresist is spin cast onto the wafer and the catalyst sites for VACNF growth are patterned. A resist capable of imaging high resolution features in the i-line stepper is chosen for this process. Currently, a 500 nm thick layer of Olin OiR 620 is used. A circular pattern 145 with a diameter of 400 to 500 nm is exposed from a dark field mask using the i-line stepper. These features are exposed in registry with the alignment marks. Following the exposures the wafers are developed in an appropriate developer. After a metallization of 100 Å to 1500 Å of catalyst (Ni, Fe, Co), the pattern 145 is transferred using a liftoff technique (the result of this sub-process is shown in FIG. 1H). The size of the catalyst material determines the sharpness of the tip at the desired length of the nanostrucure. The VACNF 150 is grown on the substrate at this time using catalytic PECVD. In this process a DC discharge was used for this purpose (the result of this sub-process is shown in FIG. 1I). Following inspection of the VACNF, the growth process may be reiterated to extend the length of the fiber or change its geometry. This change may include the growth of a cylinder on cone structure [27] or an angled cylinder on cone structure [30]. Once the fibers display the desired morphology, a layer of $SiO_2$ 155 (first protective layer) is deposited onto the wafer's surface to protect the fibers 150 during subsequent fabrication processes and to serve as an etch mask. This layer 155 is typically 2 μm thick. It should be noted that thicker or thinner oxides may by used for this purpose (the result of this sub-process is shown in FIG. 1J). A layer of photoresist is spin cast onto the wafers and the pattern of the cantilever body 160 is exposed using a bright field mask. This layer of resist is typically 1–2 μm thick. Exposures are performed using the 5× reduction stepper. Patterns can be exposed such that the catalyst site patterned in process step 1-h lies toward the end of the cantilever body directly in the center of the structure. A proximity exposure tool can also be used in this process. However, the extreme change in geometry occasioned by the presence of the high aspect ratio VACNF tips may create problems in using this type of exposure system. Following development of the pattern in an appropriate developer, pattern transfer is performed using a combination of reactive ion etching processes. First, the oxide protection layer 155 is removed until the Si surface of the wafer is exposed. This is followed by the Si layer etch using an inductively coupled power (ICP) RIE process. Currently, an ICP RIE system using the Bosch deep Si etch process is used for this purpose. This process has high selectivity to $SiO_2$ and photoresist and is capable of etching between 1 and 2 μm of Si per minute with very anisotropic sidewall profiles. After verifying that the etch has removed all Si from the patterned areas the remaining resist is stripped from the wafers using a combination of wet chemicals and ashing (the result of this sub-process is shown in FIG. 1K). The front side of the wafers is coated with a 200 nm thick layer of $Si_3N_4$ using either PECVD or LPCVD. This layer will serve as a protective layer 165 (second protective layer) during the through-wafer etch process used to release the cantilever structures (the result of this sub-process is shown in FIG. 1L). The backside of the wafers is coated in a layer of photoresist and the exposure of the bottom side of the cantilever body is performed using a bright field mask. A contact photolithography tool equipped with double-sided alignment capability is used to perform the exposure. Using the developed resist as a mask, the $Si_3N_4$ layer 135 on the backside of the wafer is patterned using an RIE process until it is completely removed from the bulk Si across at least a portion of the wafer (the result of this sub-process is shown in FIG. 1M). The wafers are then immersed in a heated solution of KOH and DI water. This process etches Si along the (111) plane creating a sloped anisotropic profile. It is also highly selective to $Si_3N_4$ and $p^+$ Si. This allows the etch process to terminate at the Si$_3$N$_4$ layer on the front side of the wafer without damaging the cantilever structure (the result of this sub-process is shown in FIG. 1N). Referring to FIG. 1N, the cantilever body 170 can be seen projecting out of and away from the remainder of the wafer 110. The process is completed by removing the Si$_3$N$_4$ 165 from the front of the wafers using RIE and the SiO$_2$ using a diluted HF solution (the result of this sub-process is shown in FIG. 1O). A cross section of the completed structure is shown in FIG. 1P. Referring to the FIG. 1P, a relieved volume 175 can be seen beneath the cantilever body 170.

Example 2

Figure 2G:
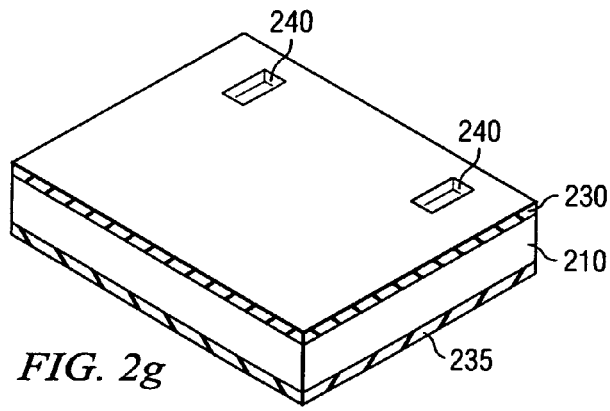
FIGS. 2A–2R illustrate schematic views of a process, representing an embodiment of the invention.
Figure 2H:
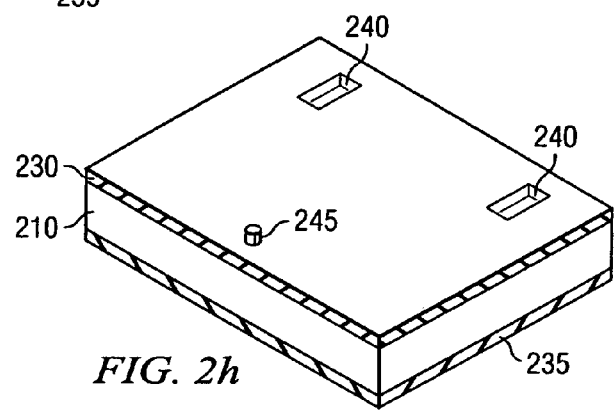
Figure 2I:
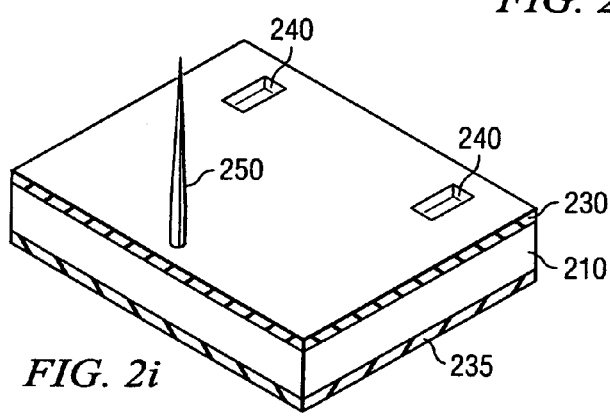
Figure 2J:
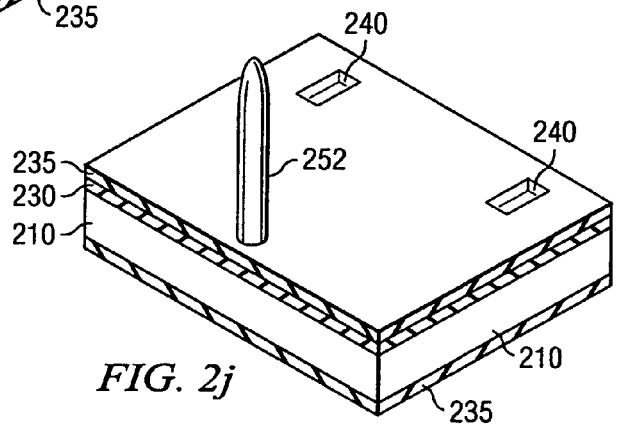
Figure 2K:
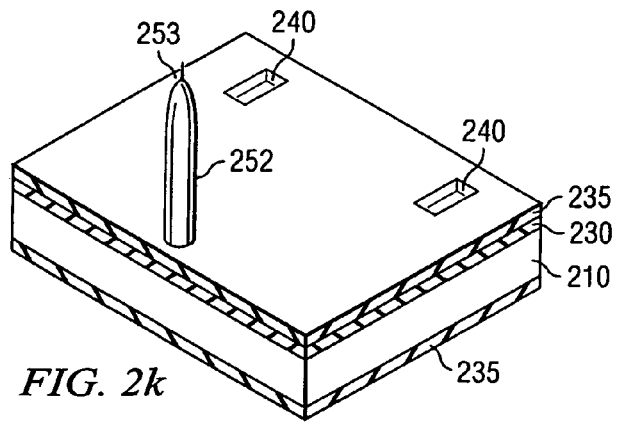
Figure 2L:
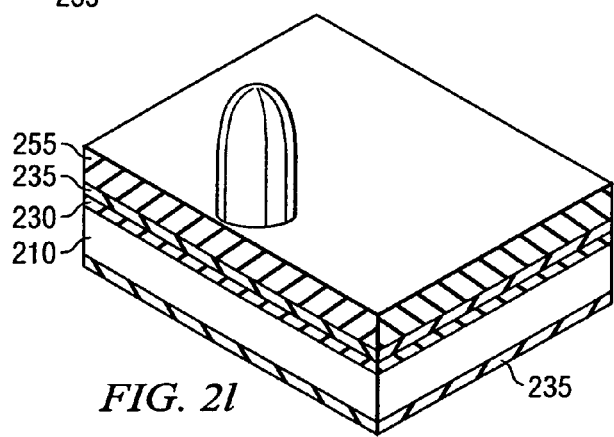
Figure 2M:
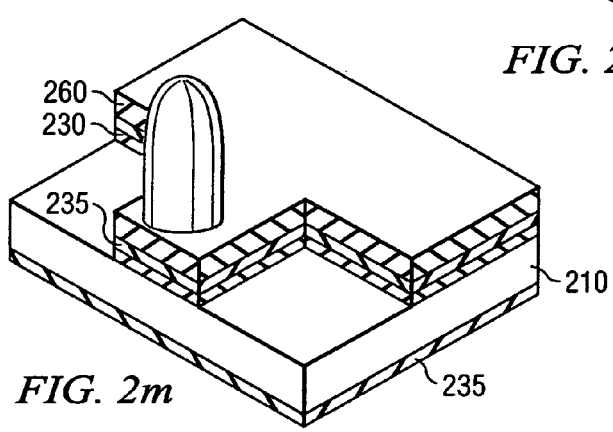
Figure 2N:
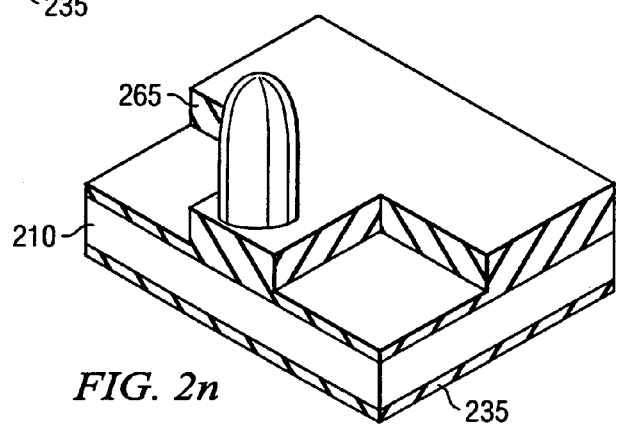
Figure 2O:
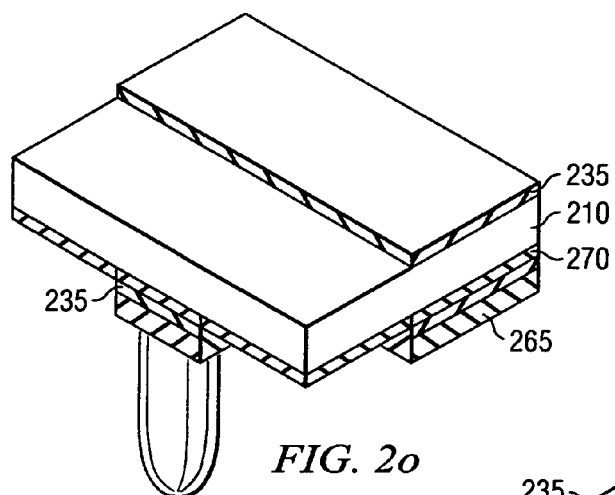
Figure 2P:
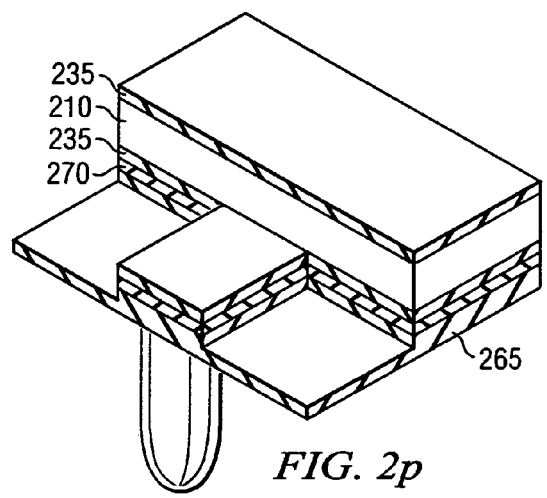
Figure 2Q:
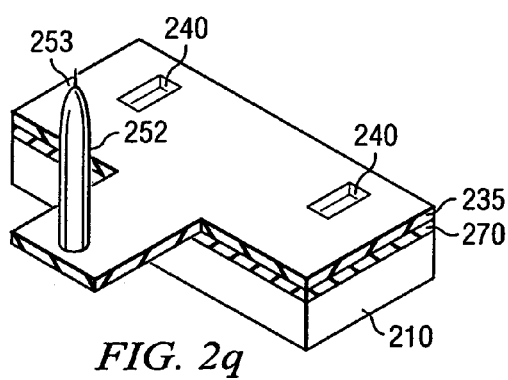
Figure 2R:
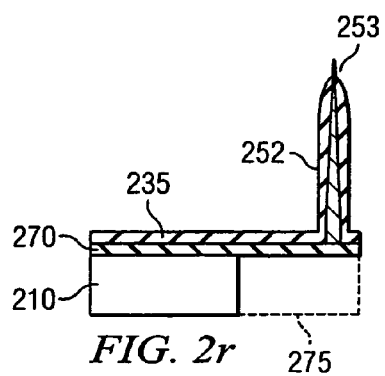

This example is a Si based process for producing high aspect ratio VACNF SPM tips on Si cantilevers for electrochemical applications using KOH for the through-wafer etch. Whole 4" intrinsic <100> Si double side polished wafers are used as the substrate 210 as shown in FIG. 2A. A highly doped p-type (p$^+$) region several microns deep is formed on the surface of the wafers using a spin-on dopant 215 (SOD). After curing the SOD layer 215 at 170° C. for 1 minute (the result of this sub-process is shown in FIG. 2B), the wafers are placed in an annealing furnace operated at 1100° C. The amount of time determines the depth of the doped region 230. For a 5 μm deep p$^+$ region 230, an annealing time of 5–6 hours is required (the result of this sub-process is shown in FIG. 2C). The SOD layer is removed from the wafers using a solution of diluted HF (the result of this sub-process is shown in FIG. 2D). This process is followed by the deposition of a 200 nm thick layer of Si$_3$N$_4$ 235 onto both sides of the wafers using LPCVD (the result of this sub-process is shown in FIG. 2E). The Si$_3$N$_4$ is stripped from the front side of the wafers to permit further processing of the underlying Si (the result of this sub-process is shown in FIG. 2F). A layer of photoresist is spin cast onto the wafers and an alignment mark pattern 240 is exposed. The pattern is transferred in to the substrate using reactive ion etching (RIE). Following this etch the photoresist was removed from the wafers using a combination of wet chemistry and ashing (the result of this sub-process is shown in FIG. 2G). Photoresist is spin cast onto the wafers and the catalyst sites 245 for VACNF growth are patterned. Following the exposures the wafers are developed in an appropriate developer. After a metallization of 100 Å to 1500 Å of catalyst (Ni, Fe, Co), the pattern 145 is transferred using a liftoff technique (the result of this sub-process is shown in FIG. 2H). The VACNF 250 is grown on the substrate at this time using catalytic PECVD. In this process a direct current discharge was used for this purpose (the result of this sub-process is shown in FIG. 2I). A layer 252 of Si$_3$N$_4$ is deposited onto the surface of the wafers, conformally coating the VACNF (the result of this sub-process is shown in FIG. 2J). Photoresist is spin cast onto the wafers such that the tips of the Si$_3$N$_4$ coated VACNF are left uncovered. A brief O$_2$ RIE is used to remove any residual resist from the tips. This is followed by a CF$_4$ RIE process to remove the Si$_3$N$_4$ from the VACNF tip 253 (the result of this sub-process is shown in FIG. 2K). This creates an electrochemical probe with an extremely small active electrode region. A layer 255 of SiO$_2$ is deposited onto the surface of the wafers to protect the fibers during subsequent fabrication processes and to serve as an etch mask. This layer 255 is typically 2 μm thick (the result of this sub-process is shown in FIG. 2L). A layer of photoresist is spin cast onto the wafers and the pattern 260 of the cantilever body is exposed using a bright field mask. Following development, pattern transfer is performed using a combination of RIE processes. First, the oxide protection layer is removed followed by the Si$_3$N$_4$ layer until the Si surface of the wafer is exposed. The Si layer is etched using an ICP RIE (the result of this sub-process is shown in FIG. 2M). The front side of the wafers is coated with a 200 nm thick layer 265 of Si$_3$N$_4$ using either PECVD or LPCVD. This layer 265 will serve as a protective layer during the through-wafer etch process used to release the cantilever structures (the result of this sub-process is shown in FIG. 2N). The backside of the wafers is coated in a layer of photoresist and the exposure of the bottom side of the cantilever body is performed using a bright field mask. Using the developed resist as a mask, the Si$_3$N$_4$ layer 235 on the backside of the wafer is patterned using an RIE process until it is completely removed from at least a portion of the bulk Si (the result of this sub-process is shown in FIG. 2O). The wafers are immersed in a heated solution of KOH and DI water to perform the through-wafer release etch, thereby forming the cantilever body 270 (the result of this sub-process is shown in FIG. 2P). The process is completed by removing the Si$_3$N$_4$ 265 from the front of the wafers using RIE and the SiO$_2$ using a diluted HF solution (the result of this sub-process is shown in FIG. 2Q). A cross section of the completed structure is shown in FIG. 2R. Referring to the FIG. 2R, a relieved volume 275 can be seen beneath the cantilever body 270.

Example 3

Figure 3E:
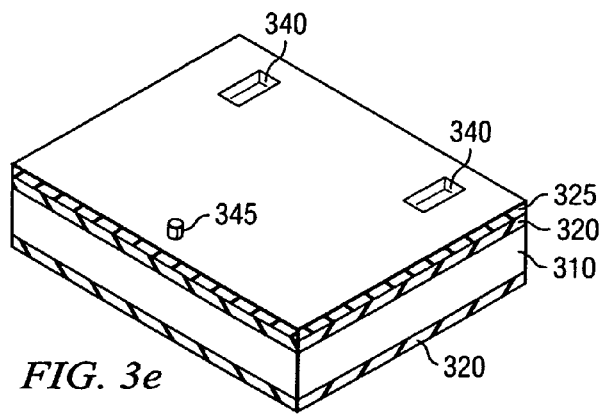
FIGS. 3A–3R illustrate schematic views of a process, representing an embodiment of the invention.
Figure 3F:
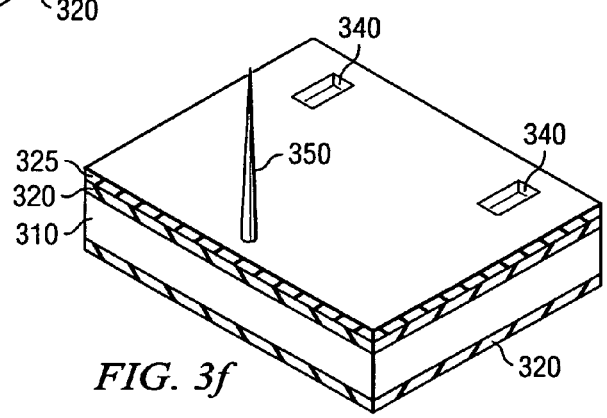
Figure 3G:
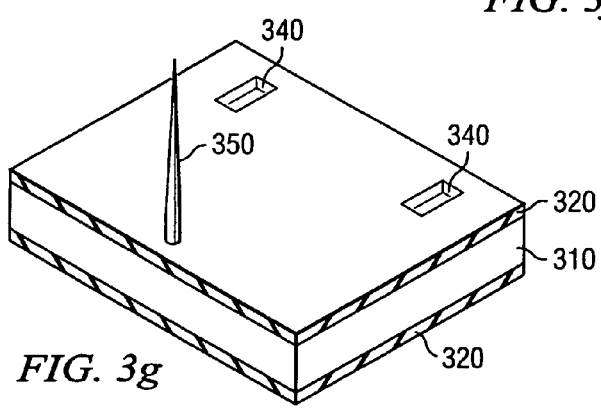
Figure 3H:
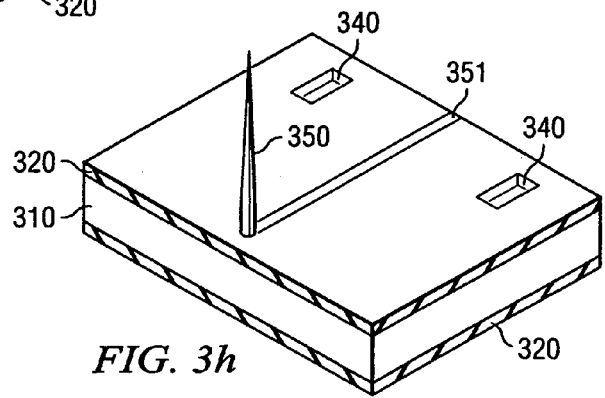
Figure 3I:
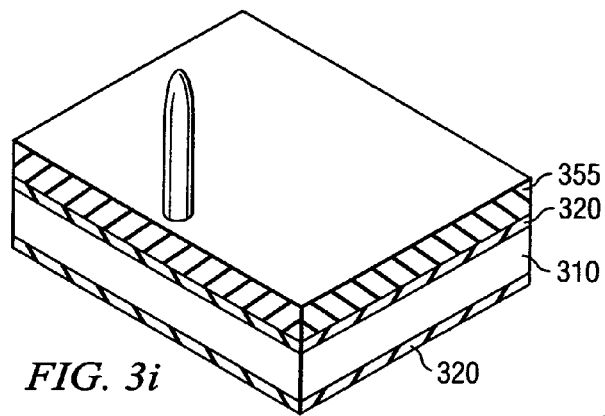
Figure 3J:
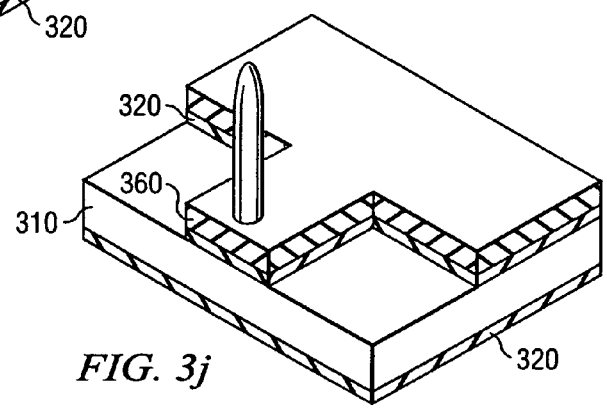
Figure 3K:
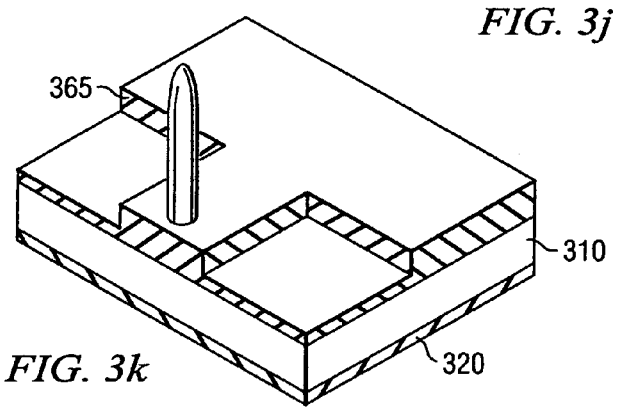
Figure 3L:
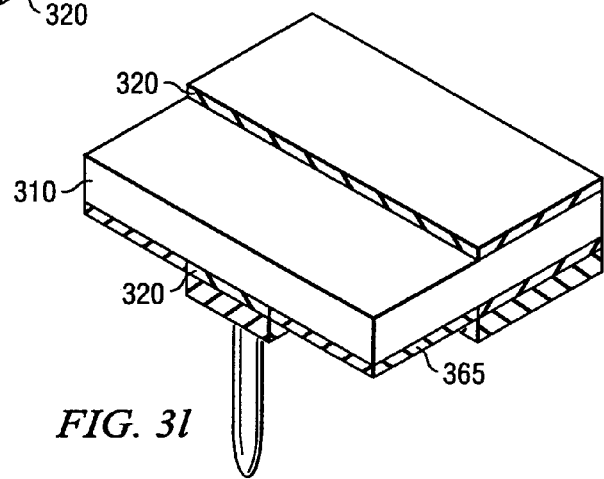
Figure 3M:
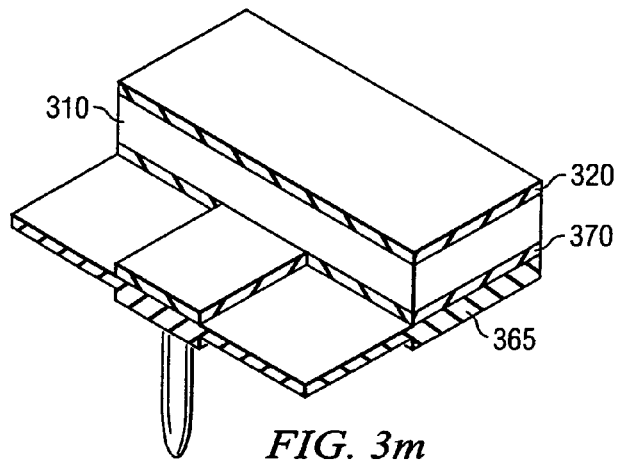
Figure 3P:
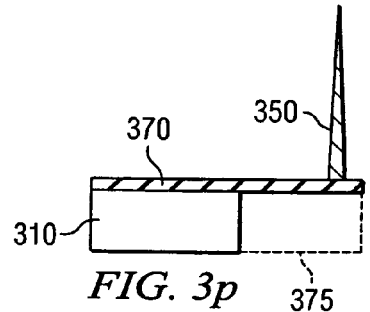
Figure 3N:
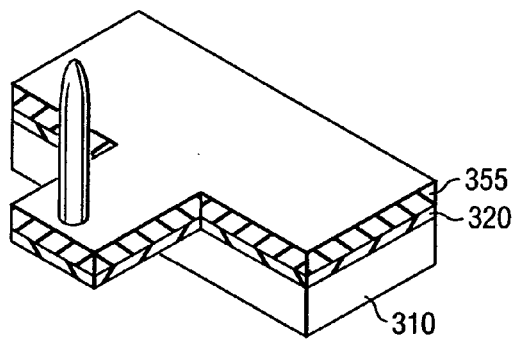
Figure 3Q:
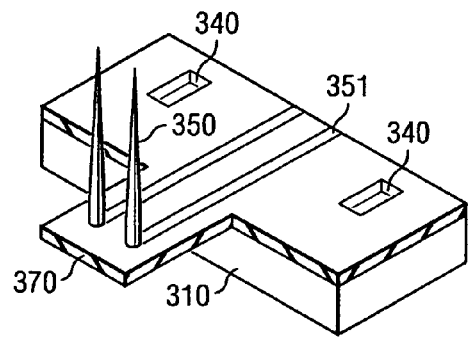
Figure 3O:
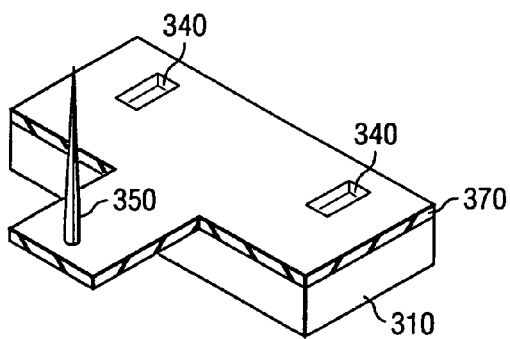
Figure 3R:
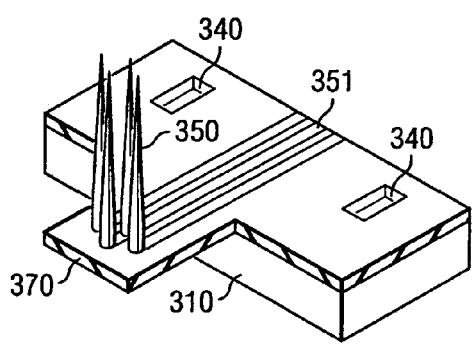

This example is a Si based process for producing high aspect ratio VACNF SPM tips on silicon nitride cantilevers using KOH for the through-wafer etch. Whole 4" intrinsic <100> Si double side polished wafers 310 are used as the substrate as shown in FIG. 3A. The wafers are placed in an LPCVD system and a layer 320 of low stress silicon nitride is deposited. This layer will form the cantilever body thus its thickness is determined by the desired resonant frequency of the cantilever structure (the result of this sub-process is shown in FIG. 3B). A 100 nm thick layer 325 of W is deposited onto the wafers. This layer 325 serves several purposes. It can be used to provide an electrical connection to the VACNF base on the completed cantilever structure. Primarily, its purpose is to prevent the surface of the wafer from charging during the direct current PECVD growth of the VACNF. If an AC discharge is used to perform the growth and no electrical contact is required to the VACNF base this step may be omitted (the result of including this sub-process is shown in FIG. 3C). A layer of photoresist is spin cast onto the wafers and an alignment mark pattern is exposed using a 5× reduction stepper. Following development, the alignment mark pattern 340 is transferred into the wafers using RIE. Following this etch the photoresist is removed from the wafers using a combination of wet chemistry and ashing (the result of this sub-process is shown in FIG. 3D). Photoresist is spin cast onto the wafers and the catalyst sites for VACNF growth are patterned. Following the exposures the wafers are developed in an appropriate developer. After a metallization of 100 Å to 1500 Å of catalyst (Ni, Fe, Co), the pattern 145 is transferred using a liftoff technique (the result of this sub-process is shown in FIG. 3E). The VACNF 350 is grown on the wafers at this time using catalytic PECVD. In this process a DC discharge was used for this purpose (the result of this sub-process is shown in FIG. 3F). Following fiber growth, the W layer is removed using an unmasked RIE process. The VACNF 350 is very robust and can survive this etch without suffering severe damage (the result of this sub-process is shown in FIG. 3G). Alternatively, the W layer can be patterned and used to form an electrical contact 351 to the VACNF base. This could be accomplished by applying a layer of photoresist and exposing a suitable electrode pattern. Following development of the pattern, RIE could be used to perform the pattern transfer followed by removal of the resist using wet chemicals and ashing (the result of this sub-process is shown in FIG. 3H). A layer 355 of $SiO_2$ is deposited onto the surface of the wafers to protect the fibers during subsequent fabrication processes and to serve as an etch mask. This layer 355 is typically 2 μm thick (the result of this sub-process is shown in FIG. 3I). A layer of photoresist is spin cast onto the wafers and the pattern 360 of the cantilever body is exposed using a bright field mask. Following development, pattern transfer is performed using a combination of RIE processes. The oxide layer is removed first, followed by the silicon nitride stopping on the Si surface. After verifying that the etch has removed all silicon nitride from the patterned areas the remaining resist is stripped from the wafer using a combination of wet chemicals and ashing (the result of this sub-process is shown in FIG. 3J). The front side of the wafers is coated with a 200 nm thick layer 365 of $Si_3N_4$ using either PECVD or LPCVD. This layer will serve as a protective layer during the through-wafer etch process used to release the cantilever structures (the result of this sub-process is shown in FIG. 3K). The backside of the wafers is coated in a layer of photoresist and the exposure of the bottom side of the cantilever body is performed using a bright field mask. Using the developed resist as a mask, the $Si_3N_4$ layer 320 on the backside of the wafer is patterned using an RIE process until it is completely removed from at least a portion of the bulk Si (the result of this sub-process is shown in FIG. 3L). The wafers are immersed in a heated solution of KOH and DI water to perform the through-wafer release etch and form the cantilever body 370 (the result of this sub-process is shown in FIG. 3M). The process is completed by removing the $Si_3N_4$ from the front of the wafers using RIE (the result of this sub-process is shown in FIG. 3N) and the $SiO_2$ using a diluted HF solution (the result of this sub-process is shown in FIG. 3O). A cross section of the completed structure is shown in FIG. 3P. Referring to the FIG. 3P, a relieved volume 375 can be seen beneath the cantilever body 370. Alternate embodiments showing multiple VACNF tips with individual electrical connections are shown in FIGS. 3Q and 3R.

Example 4

This example is a Si based process for producing high aspect ratio VACNF SPM tips on silicon nitride cantilevers for electrochemical applications using KOH for the through-wafer etch.

Figure 4A:
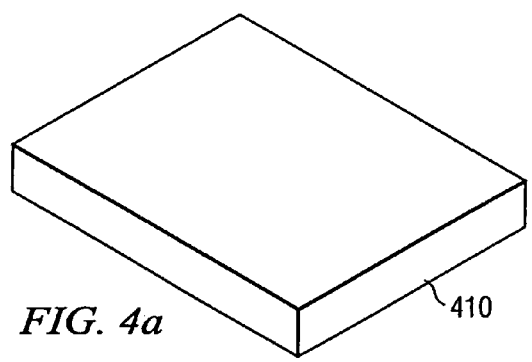
FIGS. 4A–4R illustrate schematic views of a process, representing an embodiment of the invention.
Figure 4B:
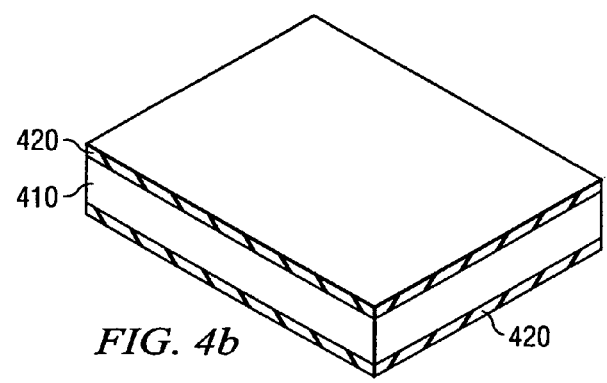
Figure 4C:
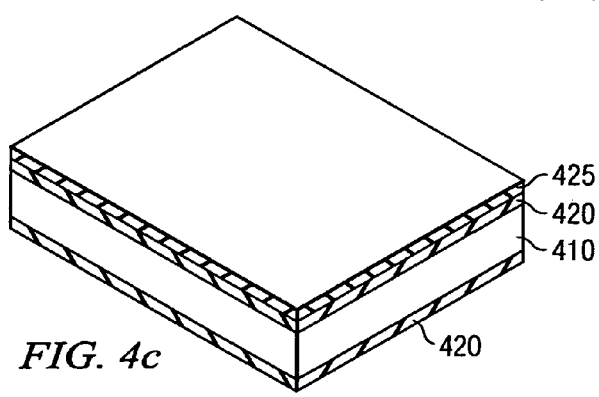
Figure 4D:
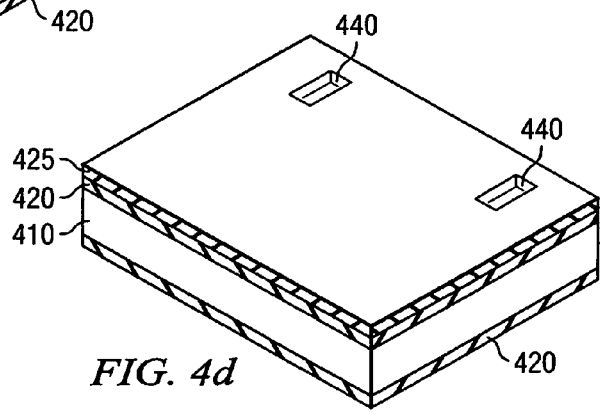
Figure 4E:
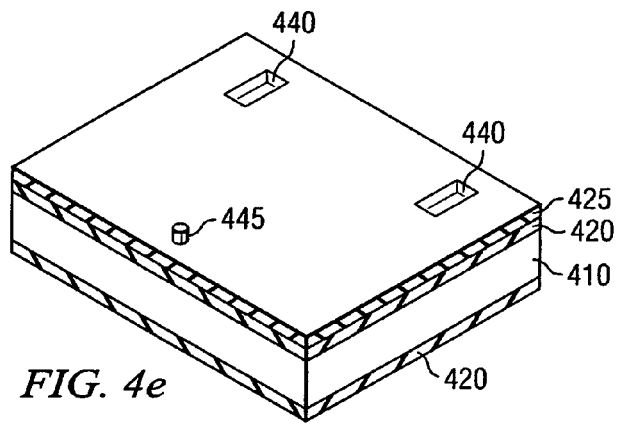
Figure 4F:
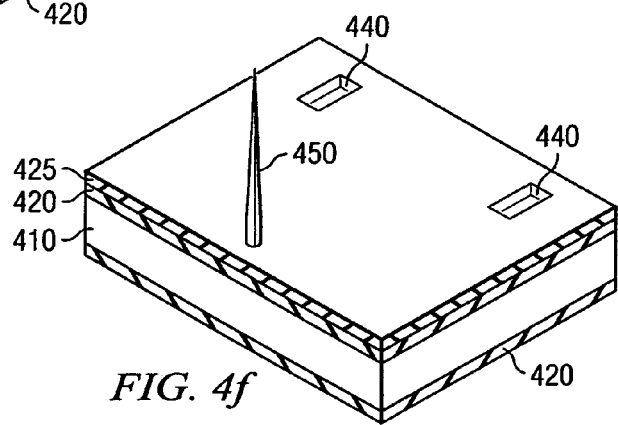
Figure 4G:
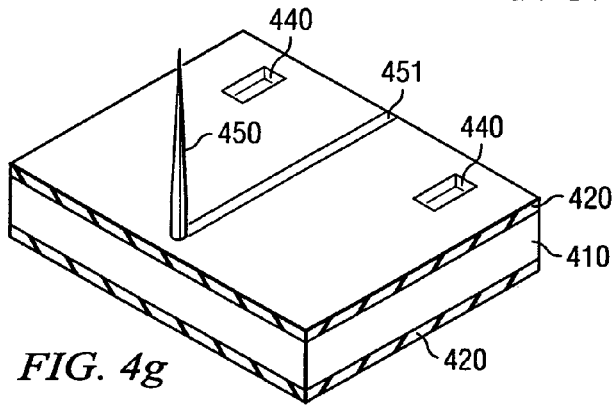
Figure 4H:
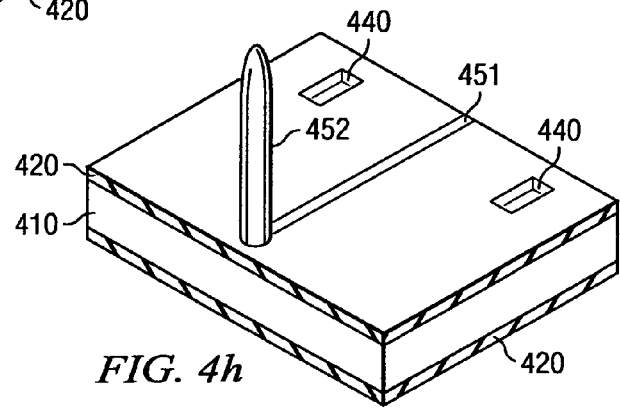
Figure 4I:
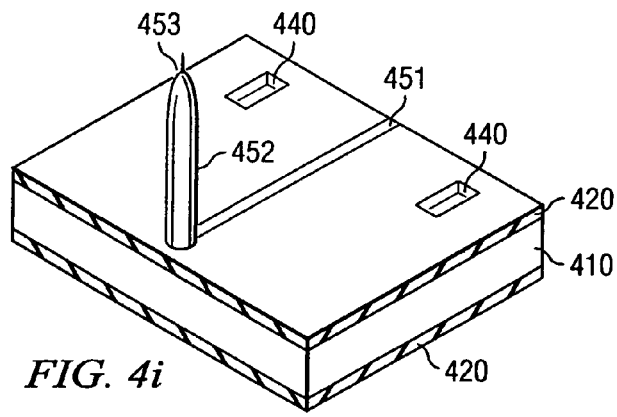
Figure 4J:
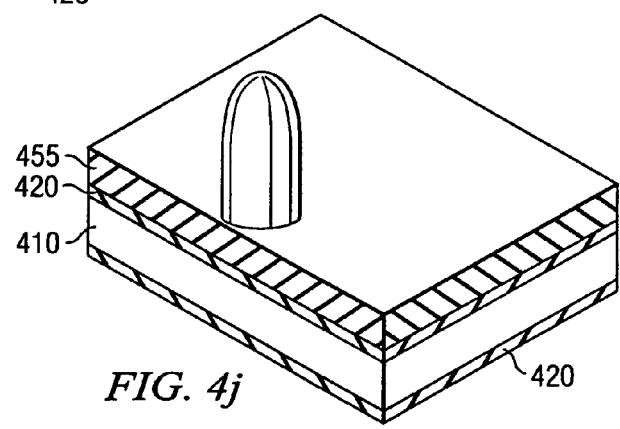
Figure 4K:
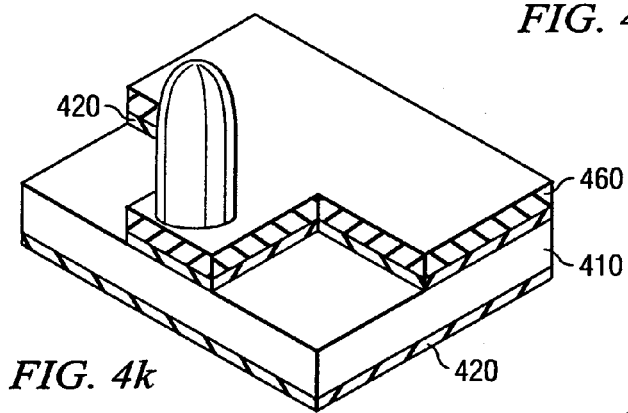
Figure 4L:
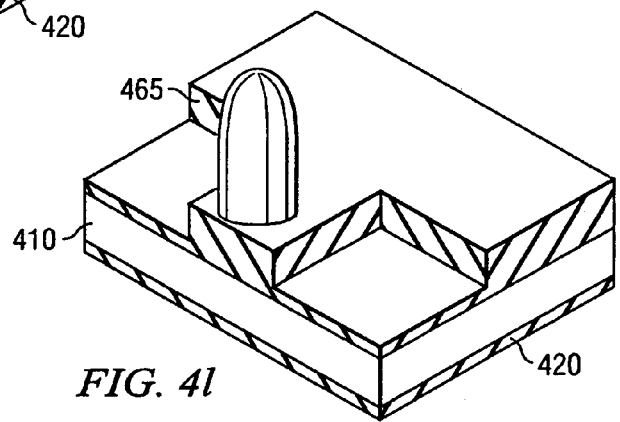

Whole 4" intrinsic <100> Si double side polished wafers are used as the substrate 410 as shown in FIG. 4A. The wafers are placed in an LPCVD system and a layer 420 of low stress silicon nitride is deposited. This layer 420 will form the cantilever body thus its thickness is determined by the desired resonant frequency of the cantilever structure (the result of this sub-process is shown in FIG. 4B). A 100 nm thick layer 425 of W is deposited onto the wafers (the result of this sub-process is shown in FIG. 4C). A layer of photoresist is spin cast onto the wafers and an alignment mark pattern is exposed using a 5× reduction stepper. Following development, the pattern 440 is transferred into the wafers using RIE. Following this etch the photoresist is removed from the wafers using a combination of wet chemistry and ashing (the result of this sub-process is shown in FIG. 4D). Photoresist is spin cast onto the wafers and the catalyst sites 445 for VACNF growth are patterned. Following the exposures the wafers are developed in an appropriate developer. After a metallization of 100 Å to 1500 Å of catalyst (Ni, Fe, Co), the pattern 145 is transferred using a liftoff technique. (the result of this sub-process is shown in FIG. 4E). The VACNF 450 is grown on the wafers at this time using catalytic PECVD. In this process a direct current discharge was used for this purpose (the result of this sub-process is shown in FIG. 4F). Following fiber growth, a layer of photoresist is applied to the wafers and an electrode pattern 451 is exposed such that the base of the VACNF will be electrically addressable. The pattern is transferred using an RIE process (the result of this sub-process is shown in FIG. 4G). A layer 452 of $Si_3N_4$ is deposited onto the surface of the wafers, conformally coating the VACNF (the result of this sub-process is shown in FIG. 4H). Photoresist is spin cast onto the wafers such that the tips 453 of the $Si_3N_4$ coated VACNF are left uncovered. A brief $O_2$ RIE is used to remove any residual resist from the tips. This is followed by a $CF_4$ RIE process to remove the $Si_3N_4$ from the VACNF tip VACNF (the result of this sub-process is shown in FIG. 4I). This creates an electrochemical probe with an extremely small active electrode region. A layer 455 of $SiO_2$ is deposited onto the surface of the wafers to protect the fibers during subsequent fabrication processes and to serve as an etch mask. This layer 455 is typically 2 μm thick (the result of this sub-process is shown in FIG. 4J). A layer of photoresist is spin cast onto the wafers and the pattern 460 of the cantilever body is exposed using a bright field mask. Following development, pattern transfer is performed using a combination of RIE processes. The oxide layer is removed first, followed by the silicon nitride stopping on the Si surface. After verifying that the etch has removed all silicon nitride from the patterned areas the remaining resist is stripped from the wafer using a combination of wet chemicals and ashing (the result of this sub-process is shown in FIG. 4K). The front side of the wafers is coated with a 200 nm thick layer 465 of $Si_3N_4$ using either PECVD or LPCVD. This layer 465 will serve as a protective layer during the through-wafer etch process used to release the cantilever structures (the result of this sub-process is shown in FIG. 4L). The backside of the wafers is coated in a layer of photoresist and the exposure of the bottom side of the cantilever body is performed using a bright field mask. Using the developed resist as a mask, the $Si_3N_4$ layer on the backside of the wafer is patterned using an RIE process until it is completely removed from at least a portion of the bulk Si (the result of this sub-process is shown in FIG. 4M). The wafers are immersed in a heated solution of KOH and DI water to perform the through-wafer release etch and form the cantilever body 470 (the result of this sub-process is shown in FIG. 4N). The process is completed by removing the $Si_3N_4$ from the front of the wafers using RIE (the result of this sub-process is shown in FIG. 4O) and the $SiO_2$ using a diluted HF solution (the result of this sub-process is shown in FIG. 4P). A cross section of the completed structure is shown in FIG. 4Q. Referring to the FIG. 4P, a relieved volume 475 can be seen beneath the cantilever body 470. Alternate embodiments showing multiple VACNF tips with individual electrical connections are shown in FIGS. 4R and 4S.

Example 5

Figure 5A:
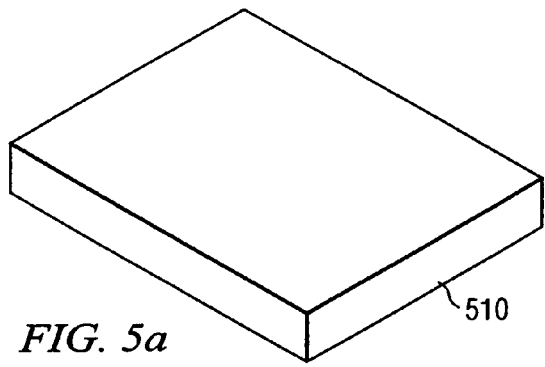
FIGS. 5A–5Q illustrate schematic views of a process, representing an embodiment of the invention.
Figure 5B:
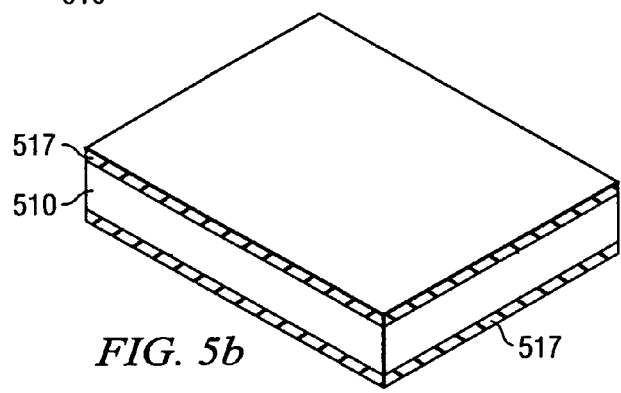
Figure 5C:
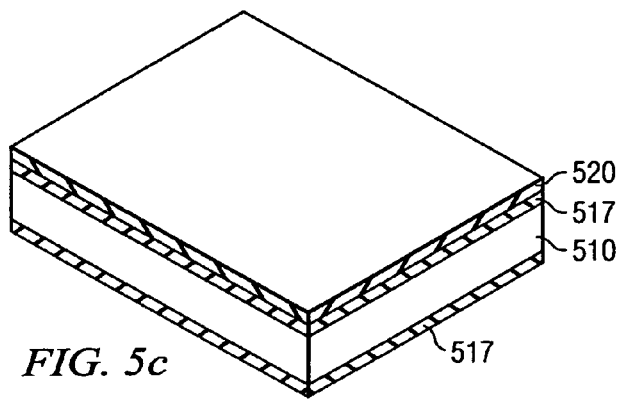
Figure 5D:
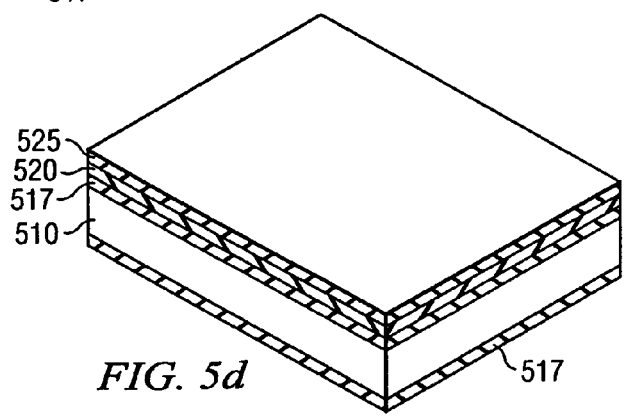
Figure 5E:
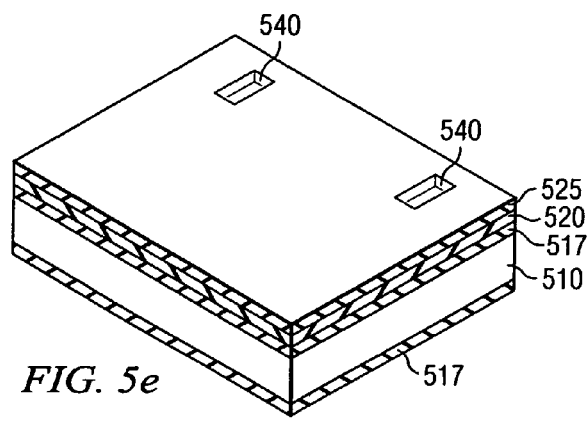
Figure 5F:
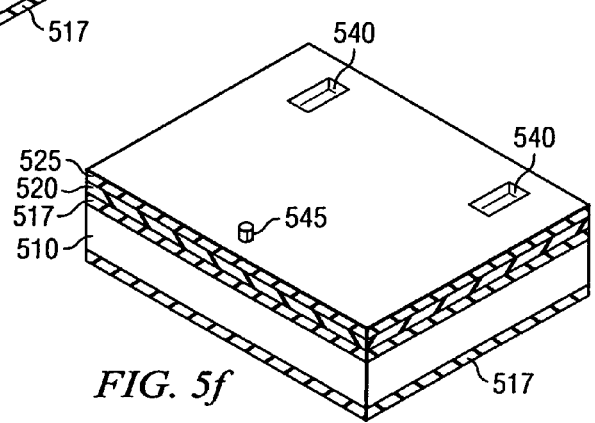
Figure 5G:
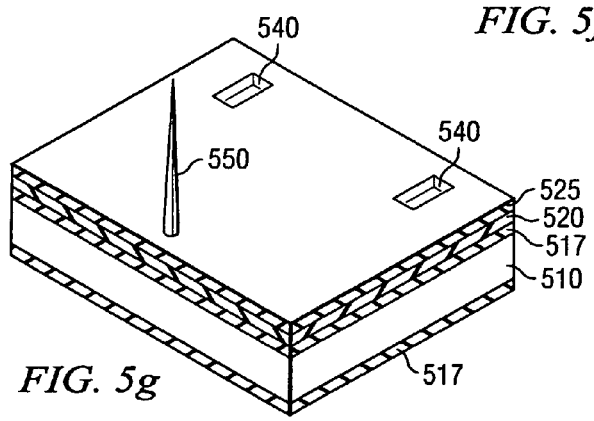
Figure 5H:
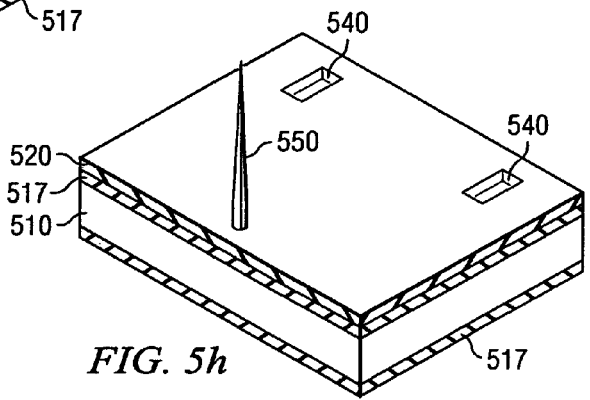
Figure 5I:
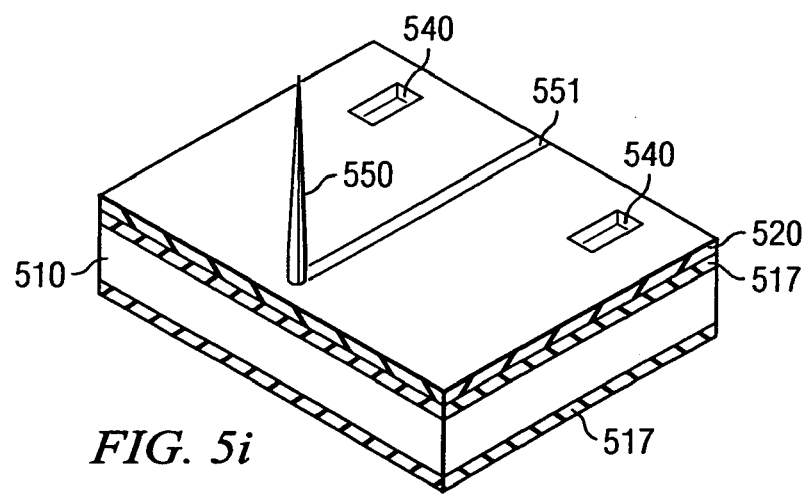
Figure 5J:
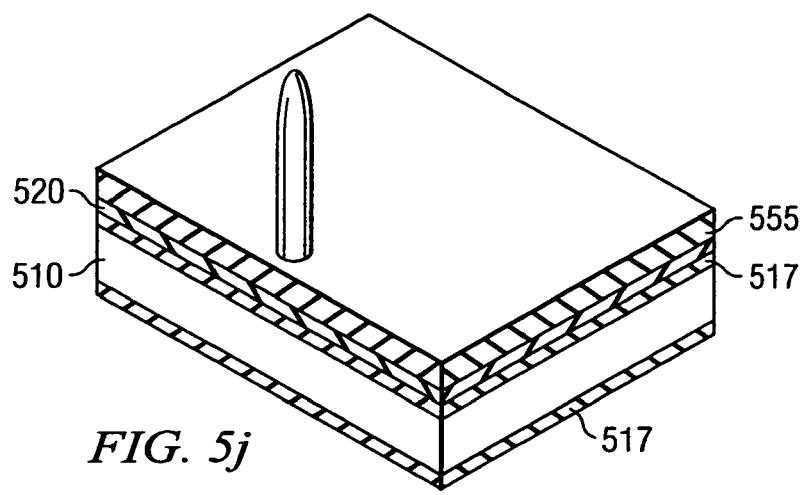
Figure 5K:
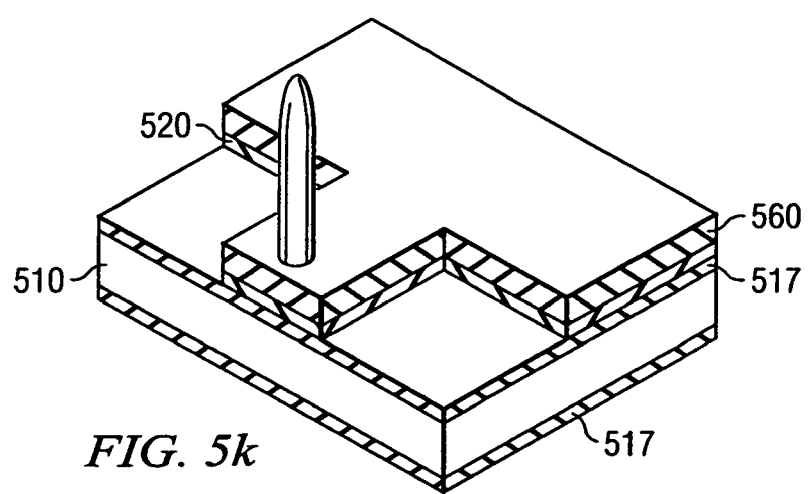

This example is a Si based process for producing high aspect ratio VACNF SPM tips on silicon nitride cantilevers using RIE for the through-wafer etch. Whole 4" double side polished Si wafers are used as the substrate 510 material (shown in FIG. 5A). Thermal oxidation of the wafers is performed to produce a 2 μm thick oxide layer 517 on the front and back of the wafer surface. The layer on the front side will function as an etch stop layer while the layer on the back side will serve as an etch mask in a subsequent process (the result of this sub-process is shown in FIG. 5B). The wafers are placed in an LPCVD system and a layer 520 of low stress silicon nitride is deposited (the result of this sub-process is shown in FIG. 5C). This layer 520 will form the cantilever body thus its thickness is determined by the desired resonant frequency of the cantilever structure. If a tube furnace type reactor is used for the deposition, this layer will be formed on both sides of the wafers. If necessary, this layer can be stripped using an RIE process. A 100 nm thick layer 525 of W is deposited on the wafers at this time (the result of this sub-process is shown in FIG. 5D). A layer of photoresist is spin cast onto the wafer and an alignment mark pattern 540 is exposed. Following development, the pattern 540 is transferred into the wafer using RIE. Following this etch the photoresist is removed from the wafers using a combination of wet chemistry and ashing (the result of this sub-process is shown in FIG. 5E). Photoresist is spin cast onto the wafer and the catalyst sites 545 for VACNF growth are patterned. Following the exposures the wafer is developed in an appropriate developer. After a metallization of 100 Å to 1500 Å of catalyst (Ni, Fe, Co), the pattern 145 is transferred using a liftoff technique (the result of this sub-process is shown in FIG. 5F). The VACNF 550 is grown on the substrate at this time using catalytic PECVD. In this process a direct current discharge was used for this purpose (the result of this sub-process is shown in FIG. 5G). The W layer is removed from the wafers using an unmasked RIE process (the result of this sub-process is shown in FIG. 5H). The VACNF is very robust and can survive this etch without suffering severe damage. Alternatively, the W layer can be patterned and used to form an electrical contact 550 to the VACNF base. This could be accomplished by applying a layer of photoresist and exposing a suitable electrode pattern. Following development of the pattern, RIE could be used to perform the pattern transfer followed by removal of the resist using wet chemicals and ashing (the result of this sub-process is shown in FIG. 5I). A layer 555 of $SiO_2$ is deposited onto the surface of the wafers to protect the fibers during subsequent fabrication processes and to serve as an etch mask. This layer 555 is typically 2 μm thick (the result of this sub-process is shown in FIG. 5J). A layer of photoresist is spin cast onto the wafers and the pattern 560 of the cantilever body is exposed using a bright field mask. This layer of resist is typically 1–2 μm thick. Exposures are performed using the 5× reduction stepper. Following development of the pattern in an appropriate developer, pattern transfer is performed using a combination of RIE processes. First, the oxide protection layer 555 is removed until the Si surface of the wafers is exposed. This is followed by an etch of the silicon nitride layer also using RIE. After verifying that the etch has removed all silicon nitride from the patterned areas the remaining resist is stripped from the wafers using a combination of wet chemicals and ashing (the result of this sub-process is shown in FIG. 5K). The backside of the wafers is coated in a layer of photoresist and the exposure of the bottom side of the cantilever body is performed using a bright field mask. A contact photolithography tool equipped with double-sided alignment capability is used to perform the exposure. Using the developed resist as a mask, the $SiO_2$ layer on the backside of the wafers is patterned using an RIE process until it is completely removed from at least a portion of the bulk Si (the result of this sub-process is shown in FIG. 5L). The patterned resist and $SiO_2$ on the backside of the wafers are used as an etch mask for a deep Si RIE (the result of this sub-process is shown in FIG. 5M). This etch is performed until the Si is entirely removed from the patterned area of the substrate and terminates on the (previously) buried oxide layer 517. The process is completed by removing the buried oxide layer 517 and the protective oxide layer 555 from the front and back side of the wafers. This is accomplished using a diluted HF etch (the result of this sub-process is shown in FIG. 5N). A cross section of the completed structure is shown in FIG. 5O. Referring to the FIG. 5O, a relieved volume 575 can be seen beneath the cantilever body 570. Alternate versions of the finished cantilever structure with 2 and 4 individually addressable electrically contacted VACNF probe tips are shown in FIGS. 5P and 5Q, respectively.

Example 6

Figure 6A:
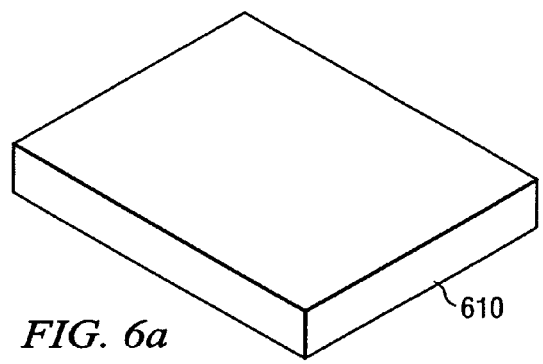
FIGS. 6A–6R illustrate schematic views of a process, representing an embodiment of the invention.
Figure 6B:
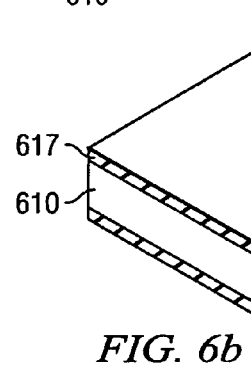
Figure 6C:
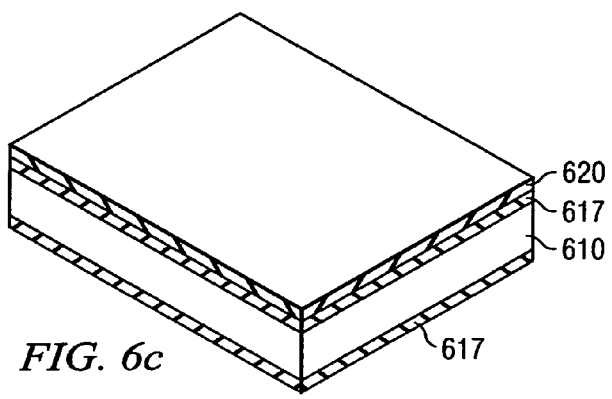
Figure 6D:
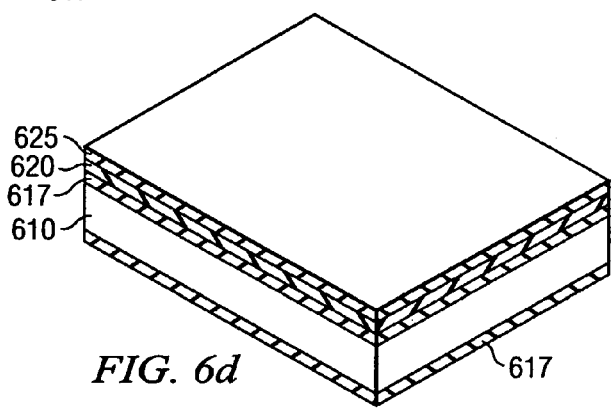
Figure 6E:
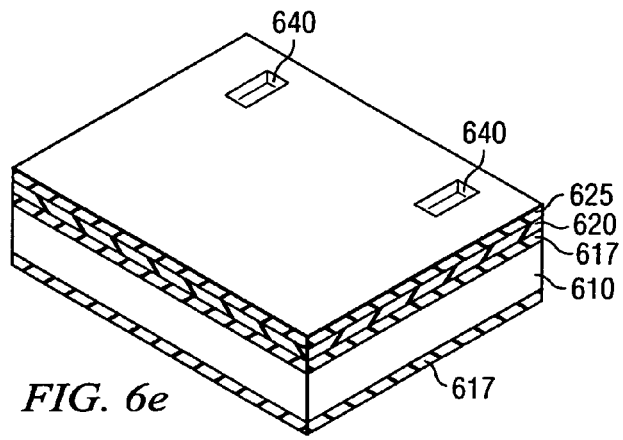
Figure 6F:
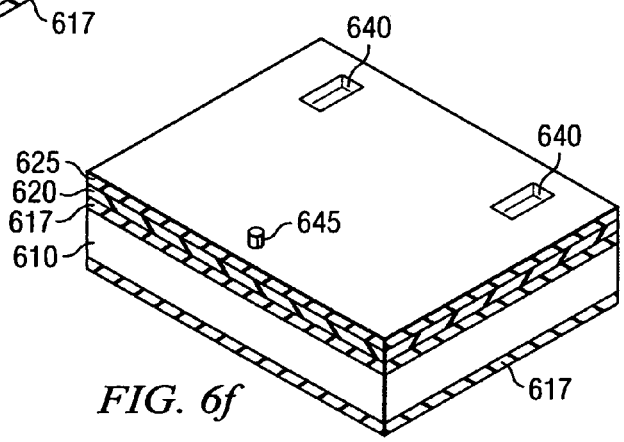
Figure 6G:
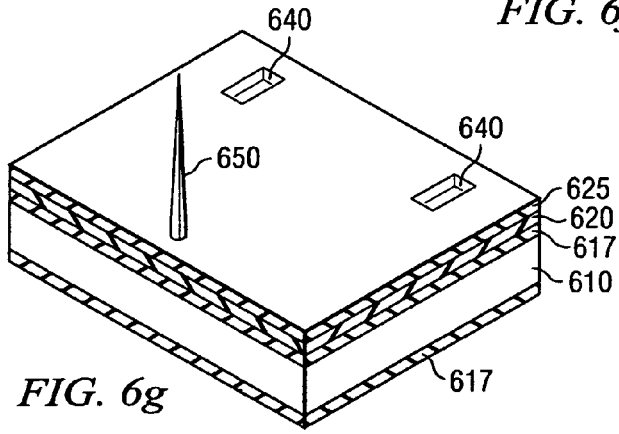
Figure 6H:
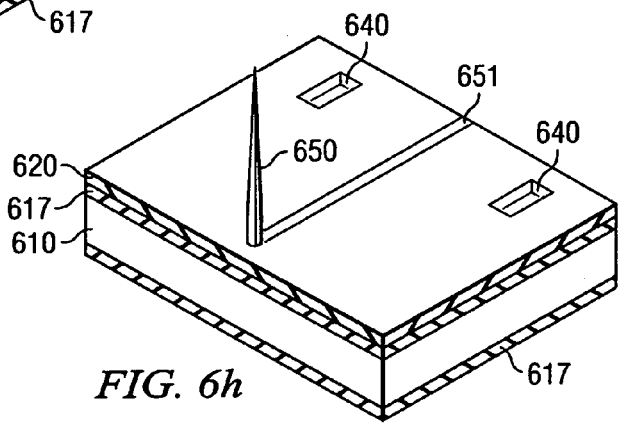
Figure 6I:
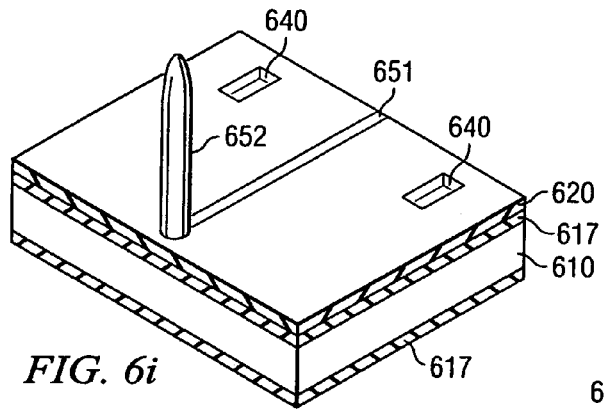
Figure 6J:
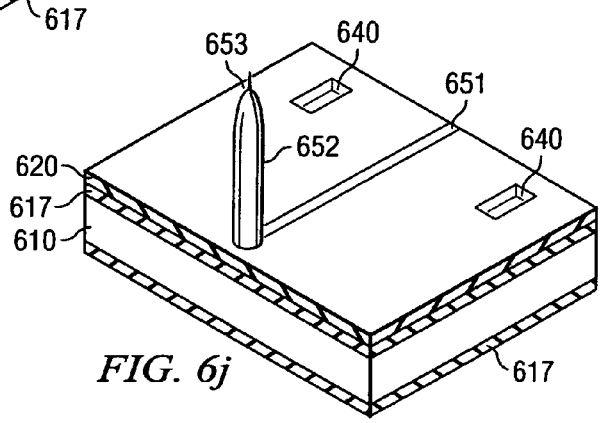
Figure 6K:
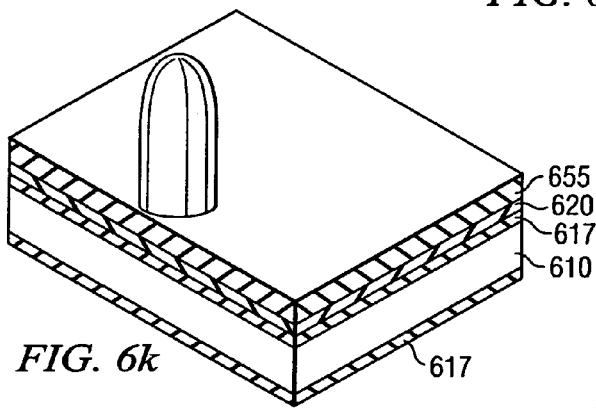
Figure 6L:
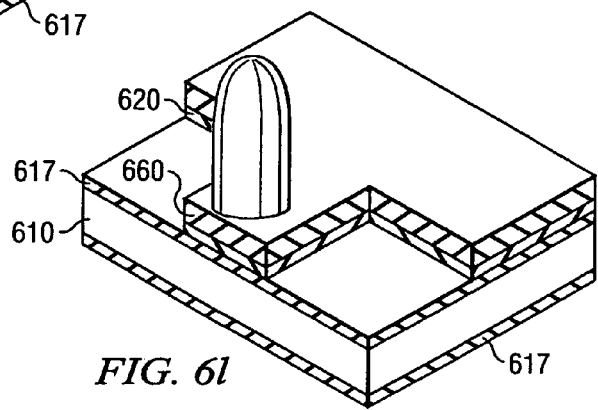
Figures 6M, 6P:
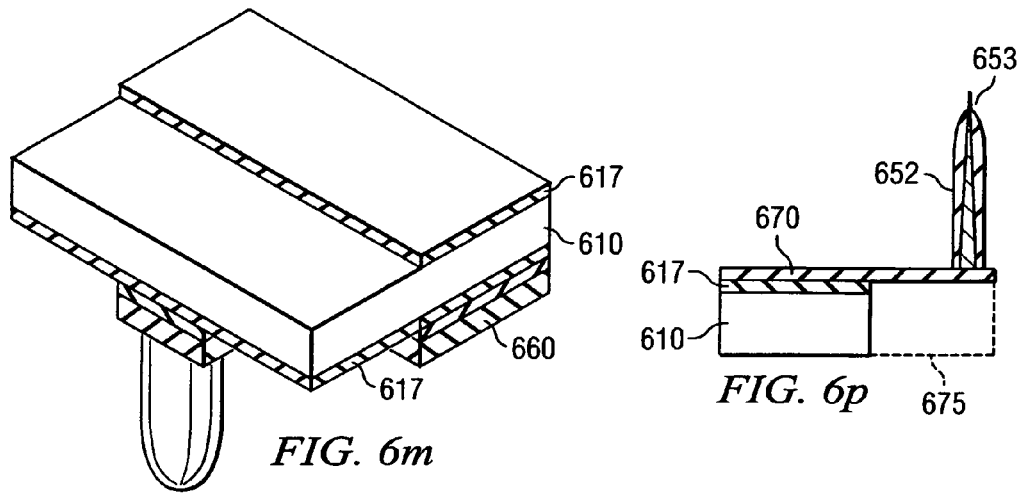
Figures 6N, 6Q:
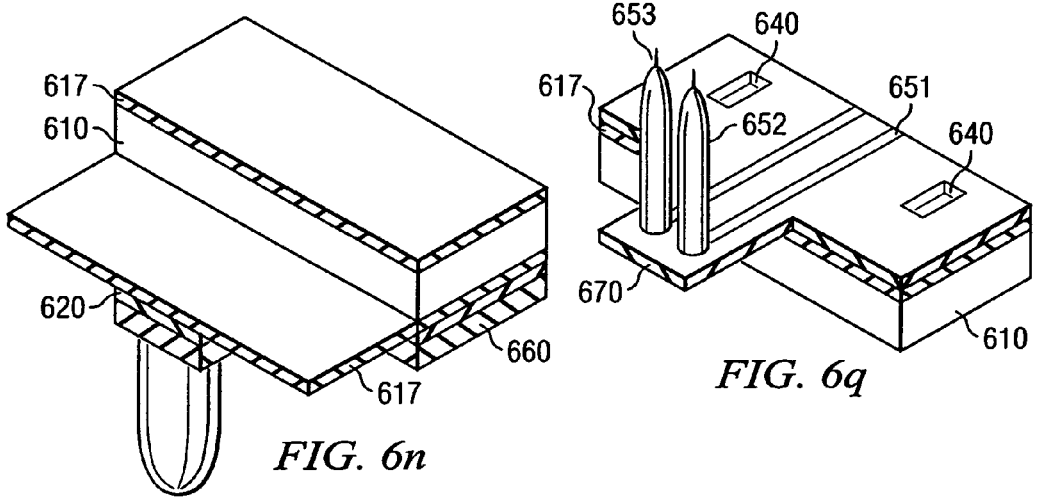
Figures 6O, 6R:
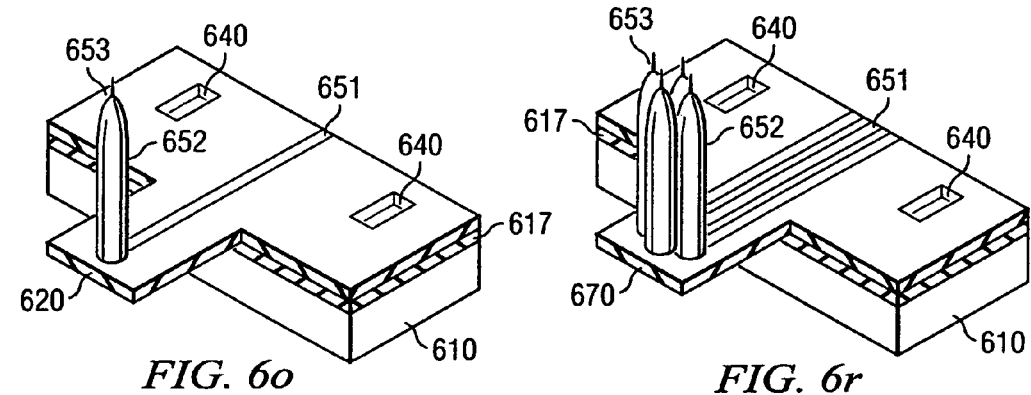

This example is a Si based process for producing high aspect ratio VACNF SPM tips on silicon nitride cantilevers for electrochemical applications using RIE for the through-wafer etchWhole 4" double side polished Si wafers are used as the substrate 610 material (shown in FIG. 6A). Thermal oxidation of the wafers is performed to produce a 2 μm thick oxide layer 617 on the front and back of the wafer surface. The layer on the front side will function as an etch stop layer while the layer on the back side will serve as an etch mask in a subsequent process (the result of this sub-process is shown in FIG. 6B). The wafers are placed in an LPCVD system and a layer 620 of low stress silicon nitride is deposited (the result of this sub-process is shown in FIG. 6C). This layer will form the cantilever body thus its thickness is determined by the desired resonant frequency of the cantilever structure. If a tube furnace type reactor is used for this deposition this layer will be formed on both sides of the wafers. If necessary, this layer can be stripped using an RIE process. A 100 nm thick layer 625 of W is deposited on the wafers at this time (the result of this sub-process is shown in FIG. 6D). A layer of photoresist is spin cast onto the wafer and an alignment mark pattern 640 is exposed. Following development, the pattern is transferred into the wafer using RIE. Following this etch the photoresist is removed from the wafers using a combination of wet chemistry and ashing (the result of this sub-process is shown in FIG. 6E). Photoresist is spin cast onto the wafer and the catalyst sites 645 for VACNF growth are patterned. Following the exposures the wafer is developed in an appropriate developer. After a metallization of 100 Å to 1500 Å of catalyst (Ni, Fe, Co), the pattern 145 is transferred using a liftoff technique (the result of this sub-process is shown in FIG. 6F). The VACNF 650 is grown on the substrate at this time using catalytic PECVD. In this process a DC discharge was used for this purpose (the result of this sub-process is shown in FIG. 6G). Following fiber growth, a layer of photoresist is applied to the wafers and an electrode pattern 651 is exposed such that the base of the VACNF will be electrically addressable. The pattern is transferred using an RIE process (the result of this sub-process is shown in FIG. 6H). A layer 652 of $Si_3N_4$ is deposited onto the surface of the wafers, conformally coating the VACNF (the result of this sub-process is shown in FIG. 6I). Photoresist is spin cast onto the wafers such that the tip(s) 653 of the $Si_3N_4$ coated VACNF are left uncovered. A brief $O_2$ RIE is used to remove any residual resist from the tips 653. This is followed by a CF$_4$ RIE process to remove the Si$_3$N$_4$ from the VACNF tip (the result of this sub-process is shown in FIG. 6J). This creates an electrochemical probe with an extremely small active electrode region. A layer of SiO$_2$ 655 is deposited onto the surface of the wafers to protect the fibers during subsequent fabrication processes and to serve as an etch mask. This layer is typically 2 µm thick (the result of this sub-process is shown in FIG. 6K). A layer of photoresist is spin cast onto the wafers and the pattern 660 of the cantilever body is exposed using a bright field mask. Following development, pattern transfer is performed using a combination of RIE processes. The oxide layer is removed first, followed by the silicon nitride stopping on the SiO$_2$ buried layer. After verifying that the etch has removed all silicon nitride from the patterned areas the remaining resist is stripped from the wafer using a combination of wet chemicals and ashing (the result of this sub-process is shown in FIG. 6L). The backside of the wafers is coated in a layer of photoresist and the exposure of the bottom side of the cantilever body 670 is performed using a bright field mask. A contact photolithography tool equipped with double-sided alignment capability is used to perform the exposure. Using the developed resist as a mask, the SiO$_2$ layer 617 on the backside of the wafers is patterned using an RIE process until it is completely removed from at least a portion of the bulk Si (the result of this sub-process is shown in FIG. 6M). The patterned resist and SiO$_2$ on the backside of the wafers are used as an etch mask for a deep Si RIE (the result of this sub-process is shown in FIG. 6N). This etch is performed until the Si is entirely removed from the patterned area of the substrate and terminates on the buried oxide layer 617. The process is completed by removing the buried oxide layer 617 and the protective oxide layer 655 from the front and back side of the wafers. This is accomplished using a diluted HF etch (the result of this sub-process is shown in FIG. 6O). A cross section of the completed structure is shown in FIG. 6P. Referring to the FIG. 6P, a relieved volume 675 can be seen beneath the cantilever body 670. Alternate versions of the finished cantilever structure with 2 and 4 individually addressable electrically contacted VACNF probe tips are shown in FIGS. 6Q and 6R, respectively.

Example 7

Figure 7A:
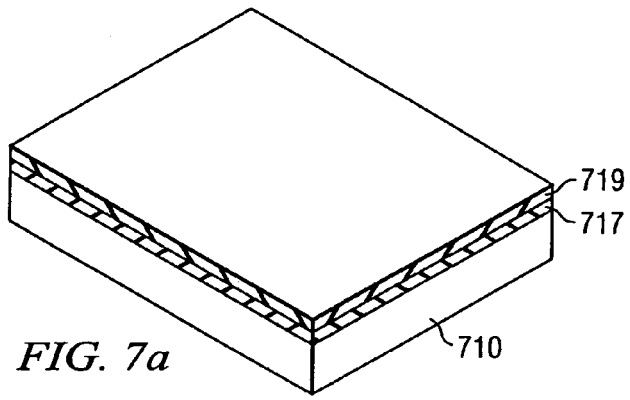
FIGS. 7A–7K illustrate schematic views of a process, representing an embodiment of the invention.
Figure 7B:
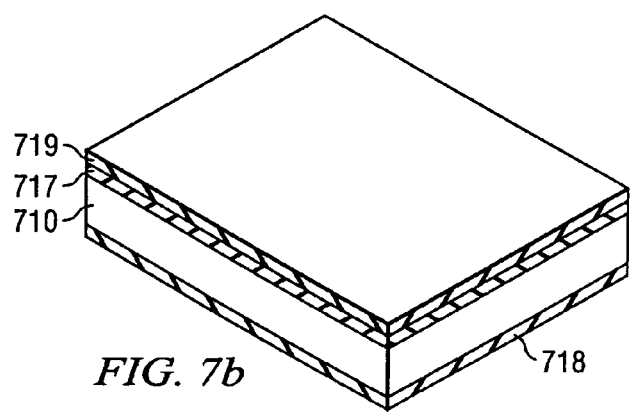
Figure 7C:
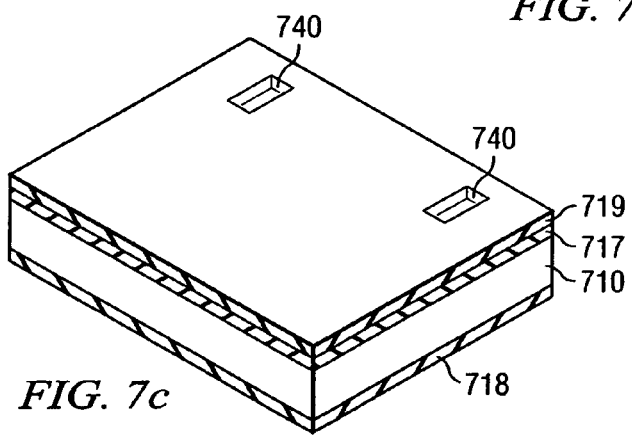
Figure 7D:
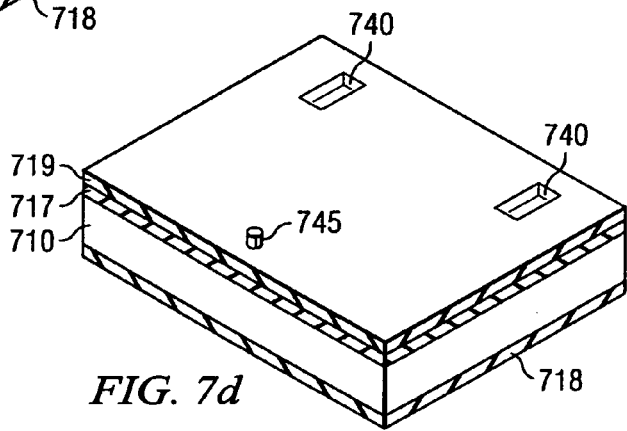
Figure 7E:
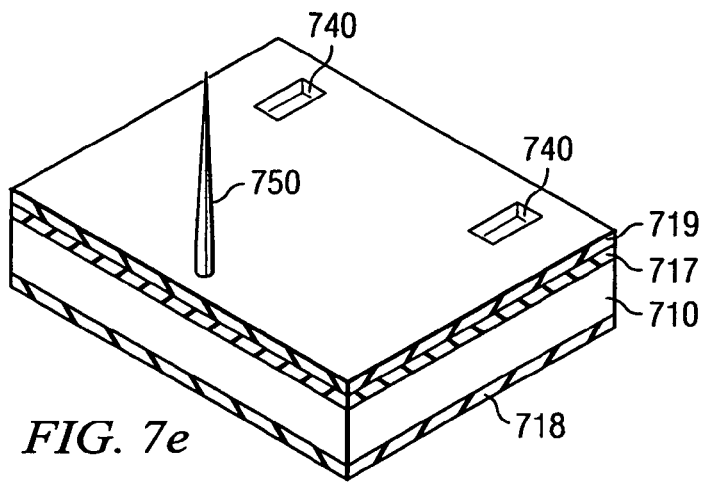
Figure 7F:
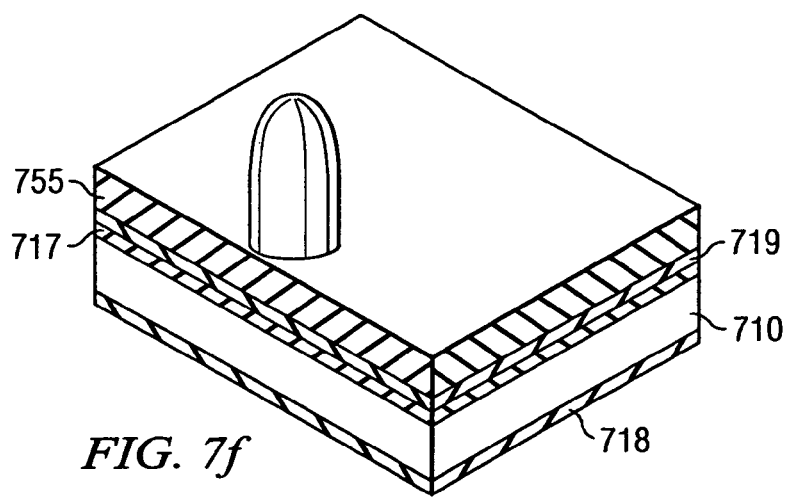
Figure 7G:
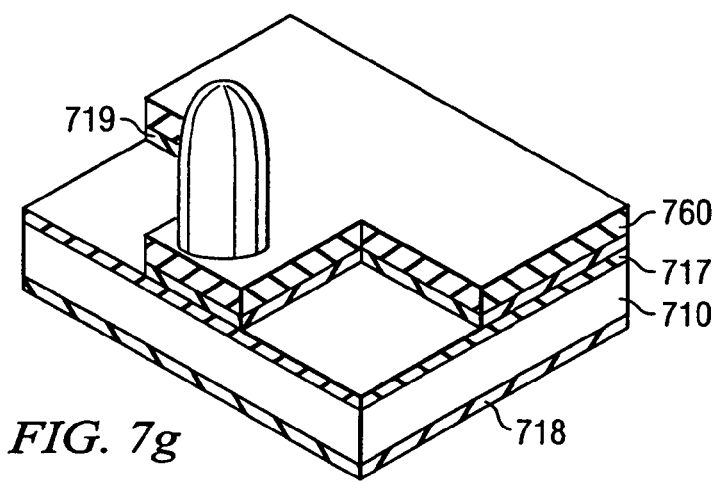
Figure 7H:
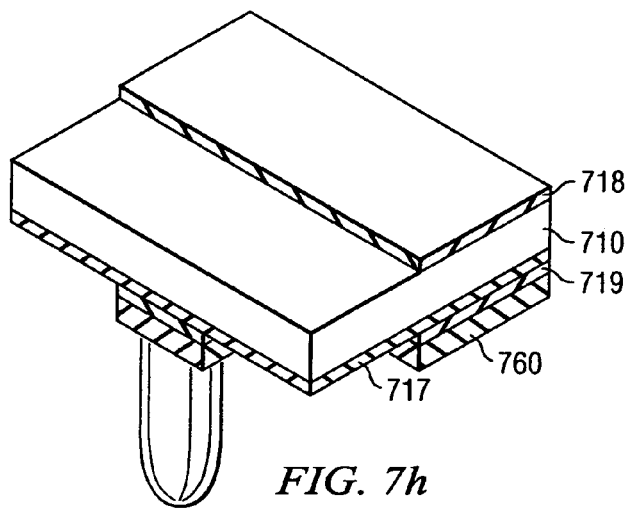
Figure 7I:
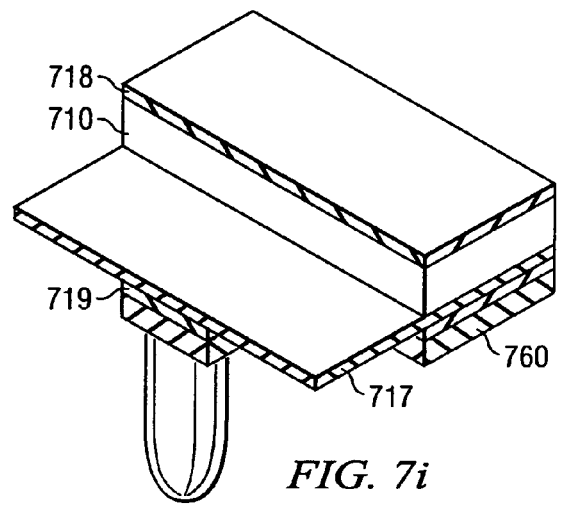
Figure 7J:
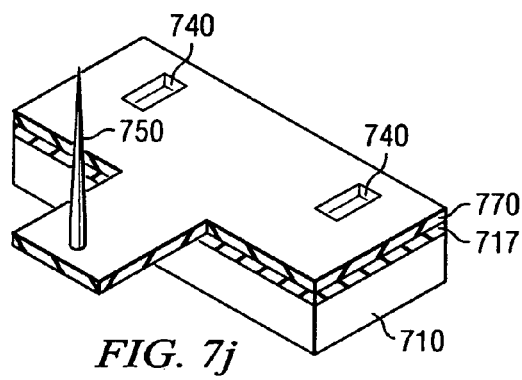
Figure 7K:
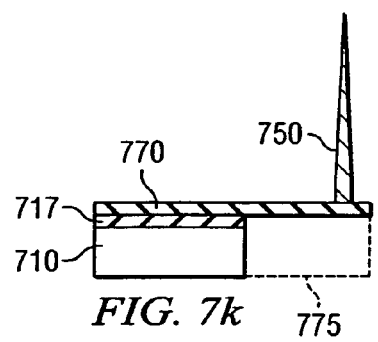

This example is a Si-on-insulator (SOI) based process for producing high aspect ratio VACNF SPM tips on Si cantilevers using RIE for the through-wafer etch. Whole 4" silicon on insulator (SOI) wafers are used as the substrate 710. This type of wafer is composed of three parts, a bulk Si substrate 710, an insulating layer 717 typically composed of thermally grown SiO$_2$ and a surface layer 719 of Si. The exampled uses a surface layer 719 of 5-µm thick single crystal Si. This layer 719 will form the cantilever body thus its thickness is determined by the desired resonant frequency of the cantilever structure and can be tailored depending on the desired result. The SiO$_2$ layer 717 with a thickness of 2 µm is used to separate the surface layer from the bulk Si. The overall wafer thickness is approximately 450 µm. Both sides of the wafer are polished to provide the high quality surface required for lithographic and deposition processes (shown in FIG. 7A). The wafers are placed in a PECVD system and a 2 to 3 µm thick SiO$_2$ film 718 is deposited onto the backside of the wafer. This layer 718 serves as an etch mask in a subsequent etching process (the result of this sub-process is shown in FIG. 7B). A layer of photoresist is spin cast onto the wafers and an alignment mark pattern is exposed. Following development, the alignment mark pattern 740 is transferred in to the substrate using RIE. The remaining photoresist is removed from the wafers using a combination of wet chemistry and ashing (the result of this sub-process is shown in FIG. 7C). Photoresist is spin cast onto the wafers and the catalyst sites 745 for VACNF growth are patterned. Following the exposures the wafer is developed in an appropriate developer. After a metallization of 100 Å to 1500 Å of catalyst (Ni, Fe, Co), the pattern 145 is transferred using a liftoff technique (the result of this sub-process is shown in FIG. 7D). The VACNF 750 is grown on the wafers using catalytic PECVD. In this process a direct current discharge was used for this purpose (the result of this sub-process is shown in FIG. 7E). A layer 755 of SiO$_2$ is deposited onto the surface of the wafers to protect the fibers during subsequent fabrication processes and to serve as an etch mask. This layer is typically 2 µm thick (the result of this sub-process is shown in FIG. 7F). A layer of photoresist is spin cast onto the wafers and the pattern 760 of the cantilever body is exposed using a bright field mask. Following development of the pattern in an appropriate developer, pattern transfer is performed using a combination of RIE processes. First, the oxide protection layer is removed until the Si surface of the wafers is exposed. This is followed by the Si layer etch using an ICP RIE process. After verifying that the etch has removed all Si from the patterned areas the remaining resist is stripped from the wafers using a combination of wet chemicals and ashing (the result of this sub-process is shown in FIG. 7G). The backside of the wafers is coated in a layer of photoresist and the exposure of the bottom side of the cantilever body is performed using a bright field mask. A contact photolithography tool equipped with double-sided alignment capability is used to perform the exposure. Using the developed resist as a mask, the SiO$_2$ layer on the backside of the wafers is patterned using an RIE process until it is completely removed from at least a portion of the bulk Si (the result of this sub-process is shown in FIG. 7H). The patterned resist and SiO$_2$ 718 on the backside of the wafers are used as an etch mask for a deep Si RIE. This etch is performed until the Si is entirely removed from the patterned area of the substrate and terminates on the buried oxide layer 717 (the result of this sub-process is shown in FIG. 7I). The process is completed by removing the buried oxide layer and the protective oxide layer from the front and back side of the wafers. This is accomplished using a diluted HF etch (the result of this sub-process is shown in FIG. 7J). A cross section of the completed structure is shown in FIG. 7K. Referring to the FIG. 7K, a relieved volume 775 can be seen beneath the cantilever body 770.

Example 8

This example is a Si-on-insulator (SOI) based process for producing high aspect ratio VACNF SPM tips on Si cantilevers for electrochemical applications using RIE for the through-wafer etch. Whole 4" SOI wafers are used as the substrate 810 as described above in example 7 (the insulating silica layer 817 and the silicon layer 819 are shown in FIG. 8A). The wafers are placed in a PECVD system and a 2 to 3 µm thick SiO$_2$ film 818 is deposited onto the backside of the wafer. This layer 818 serves as an etch mask in a subsequent etching process (the result of this sub-process is shown in FIG. 8B). A layer of photoresist is spin cast onto the wafers and an alignment mark pattern 840 is exposed. Following development, the pattern is transferred in to the substrate using RIE. The remaining photoresist is removed from the wafers using a combination of wet chemistry and ashing (the result of this sub-process is shown in FIG. 8C).

Figure 8F:
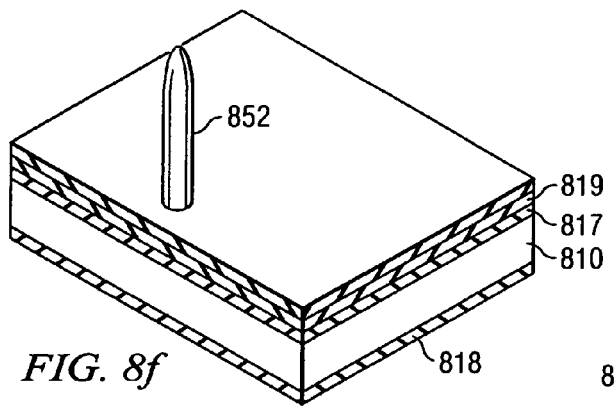
Figure 8G:
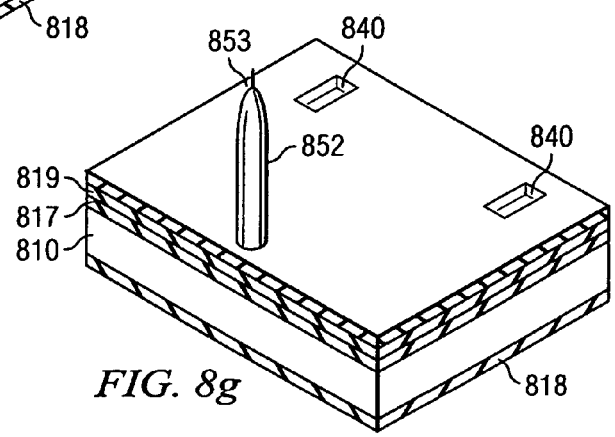
Figure 8H:
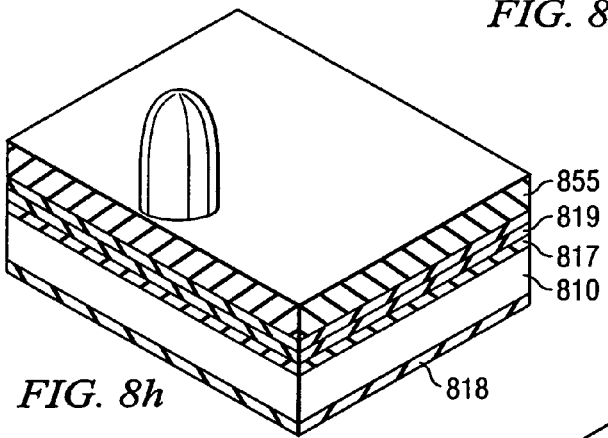
Figure 8I:
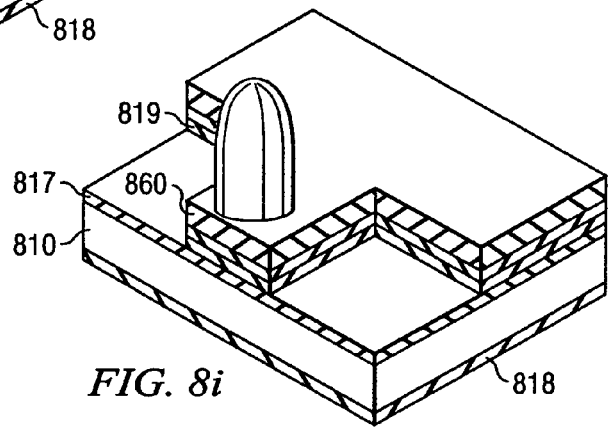
Figure 8J:
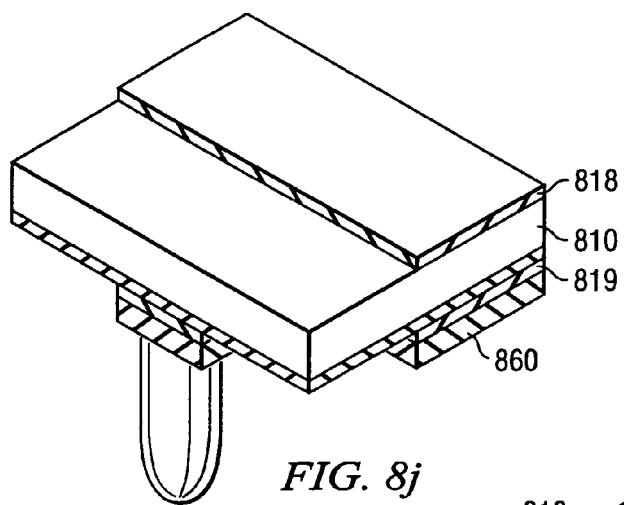
Figure 8K:
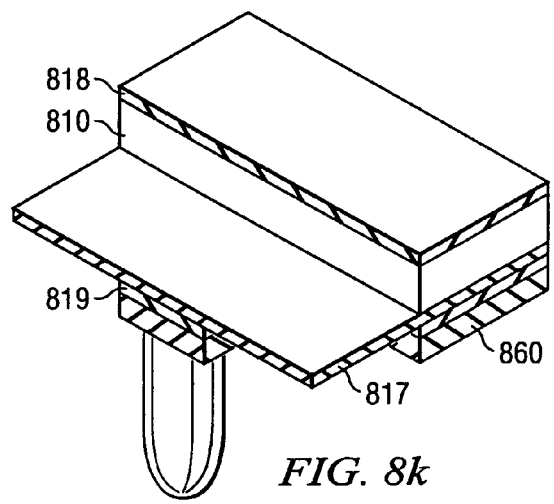
Figure 8L:
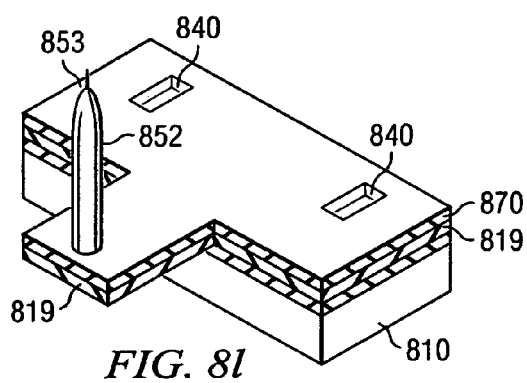
Figure 8M:
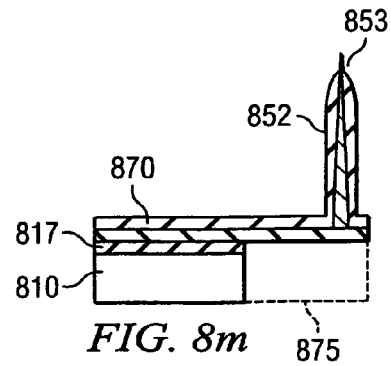

Photoresist is spin cast onto the wafers and the catalyst sites 845 for VACNF growth are patterned. Following the exposures the wafer is developed in an appropriate developer. After a metallization of 100 Å to 1500 Å of catalyst (Ni, Fe, Co), the pattern 145 is transferred using a liftoff technique (the result of this sub-process is shown in FIG. 8D). The VACNF 850 is grown on the wafers using catalytic PECVD. In this process a direct current discharge was used for this purpose (the result of this sub-process is shown in FIG. 8E). A layer 852 of $Si_3N_4$ is deposited onto the surface of the wafers, conformally coating the VACNF 850 (the result of this sub-process is shown in FIG. 8F). Photoresist is spin cast onto the wafers such that the tips of the $Si_3N_4$ coated VACNF are left uncovered. A brief $O_2$ RIE is used to remove any residual resist from the tips. This is followed by a $CF_4$ RIE process to remove the $Si_3N_4$ from the VACNF tip 853 (the result of this sub-process is shown in FIG. 8G). This creates an electrochemical probe with an extremely small active electrode region. A layer 855 of $SiO_2$ is deposited onto the surface of the wafers to protect the VACNF 850 during subsequent fabrication processes and to serve as an etch mask. This layer 855 is typically 2 μm thick (the result of this sub-process is shown in FIG. 8H). A layer of photoresist is spin cast onto the wafers and the pattern of the cantilever body 860 is exposed using a bright field mask. Following development of the pattern in an appropriate developer, pattern transfer is performed using a combination of RIE processes. First, the oxide 855 and nitride 852 layers are removed until the Si surface of the wafers is exposed. This is followed by the Si layer etch using an ICP RIE process. After verifying that the etch has removed all Si from the patterned areas the remaining resist is stripped from the wafers using a combination of wet chemicals and ashing (the result of this sub-process is shown in FIG. 8I). The backside of the wafers is coated in a layer of photoresist and the exposure of the bottom side of the cantilever body 870 is performed using a bright field mask. A contact photolithography tool equipped with double-sided alignment capability is used to perform the exposure. Using the developed resist as a mask, the $SiO_2$ layer 818 on the backside of the wafers is patterned using an RIE process until it is completely removed from at least a portion of the bulk Si (the result of this sub-process is shown in FIG. 8J). The patterned resist and $SiO_2$ on the backside of the wafers are used as an etch mask for a deep Si RIE. This etch is performed until the Si is entirely removed from the patterned area of the substrate and terminates on the buried oxide layer 817 (the result of this sub-process is shown in FIG. 8K). The process is completed by removing the buried oxide layer 817 and the protective oxide layer 855 from the front and back side of the wafers. This is accomplished using a diluted HF etch (the result of this sub-process is shown in FIG. 8L). A cross section of the completed structure is shown in FIG. 8M. Referring to the FIG. 8M, a relieved volume 875 can be seen beneath the cantilever body 870.

Example 9

Figure 9G:
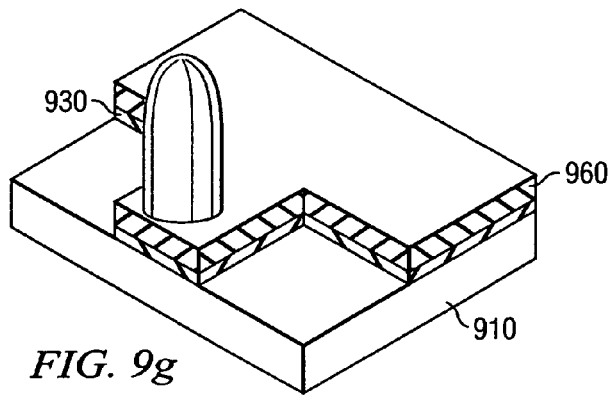

This example has been implemented to make cantilever structures for which SEM characterization data is included. It can be appreciated that the characterization data demonstrated unexpectedly advantageous results. FIGS. 9A-9J show an overview of a VACNF-based high aspect ratio SPM tip fabrication process used in a proof of principle demonstration. Whole 4" undoped <100> Si double side polished wafers were used as the substrate 910 as shown in FIG. 9A. A highly doped p-type ($p^+$) region 930 several microns deep was created on the surface of the wafers. The depth of this layer 930 determines the thickness of the final cantilever structure and, ultimately, the resonant frequency of the cantilever. This doping can be accomplished using a variety of techniques. The example used a spin-on dopant (SOD) consisting of a borosilicate glass (BSG). After spin casting and curing the SOD, the wafers were placed in an annealing furnace operated at 1100° C. The amount of annealing time determines the depth of the doped region 930. For a 10 μm deep $p^+$ region, an annealing time of 10–12 hours was required. The SOD layer was removed from the wafers using a solution of diluted hydrofluoric acid (HF) (the result of this sub-process is shown in FIG. 9B). A layer of photoresist was spin cast onto the wafers and an alignment mark pattern 940 was exposed. This example used an optical i-line 5× reduction step and repeat (stepper) system. The exposed pattern consisted of alignment marks for the stepper and a double-sided contact aligner (allows exposure of patterns on both sides of a substrate). Following development, the pattern was transferred into the substrate using reactive ion etching (RIE). Following this etch the photoresist was removed from the wafers (the result of this sub-process is shown in FIG. 9C). Photoresist was spin cast onto the wafer and the catalyst sites 945 for VACNF growth were patterned. A resist capable of imaging high-resolution features in the i-line stepper was chosen for this process (Olin, 620-0.7i). A circular pattern with a diameter of 400 to 500 nm was exposed from a dark field mask using the i-line stepper. These features were exposed in registry with the alignment marks on the wafer. Following the exposures the wafers were developed in an appropriate aqueous developer with a normality of 0.26 N (Shipley, CD-26). After a metallization of 100 Å to 1500 Å of catalyst (Ni, Fe, Co), the pattern 145 is transferred using a liftoff technique). (the result of this sub-process is shown in FIG. 9D). The VACNF 950 were grown on the substrate at this time using catalytic DC plasma enhanced chemical vapor deposition (PECVD) (the result of this sub-process is shown in FIG. 9E).

Figure 10A:
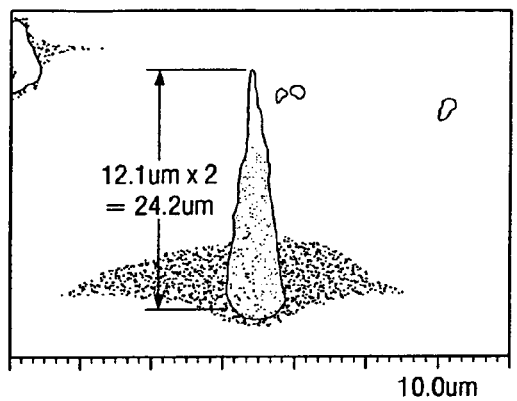
FIGS. 10–10B illustrate scanning electron micrographs of an isolated VACNF, representing an embodiment of the invention.
Figure 10B:
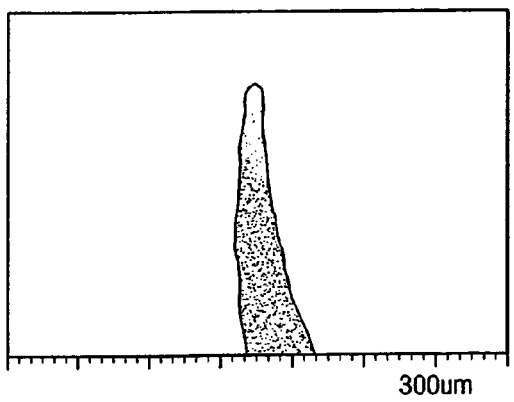

A scanning electron microscope (SEM) image of a high aspect ratio VACNF produced for this work using the processes disclosed above is shown in FIG. 10A. A high magnification image of the tip is shown in FIG. 10B demonstrating the feasibility of this approach. FIGS. 10A–10B show (FIG. 10A) an isolated VACNF grown from a 500 nm diameter Ni dot patterned by photolithography and (FIG. 10B) a high magnification image of the VACNF tip. Both of these images were taken at 30° from normal incidence in an SEM. It is worth noting that a buffer layer of Ti can be deposited prior to the deposition of the Ni layer and that the thickness of the Ni can be changed. In both cases single VACNF can be produced. However, the parameters of the growth process will differ.

Following inspection of the VACNF a 2 μm thick layer 955 of $SiO_2$ was deposited onto the surface of the wafers to protect the fibers during subsequent fabrication processes and to serve as an etch mask (the result of this sub-process is shown in FIG. 9F). This layer 955 which substantially surrounds at least a portion of the VACNF can be termed a first protective layer.

Figure 11:
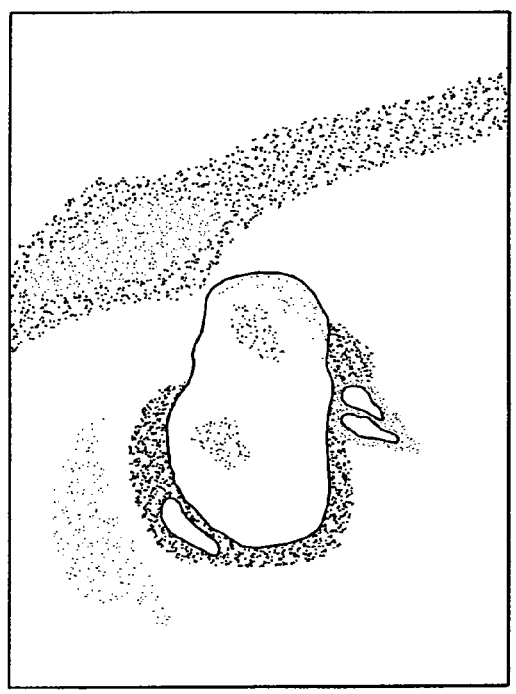
FIG. 11 illustrates a scanning electron micrograph of a VACNF coated with SiO2, representing an embodiment of the invention.

An SEM image of an oxide coated VACNF produced during this process is shown in FIG. 11. FIG. 11 shows a VACNF coated in 2 μm of $SiO_2$. This SEM image was obtained at 45° from normal incidence.

Figure 9H:
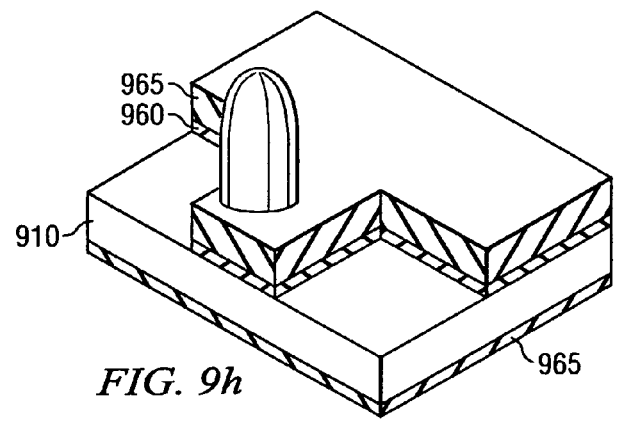
Figure 9I:
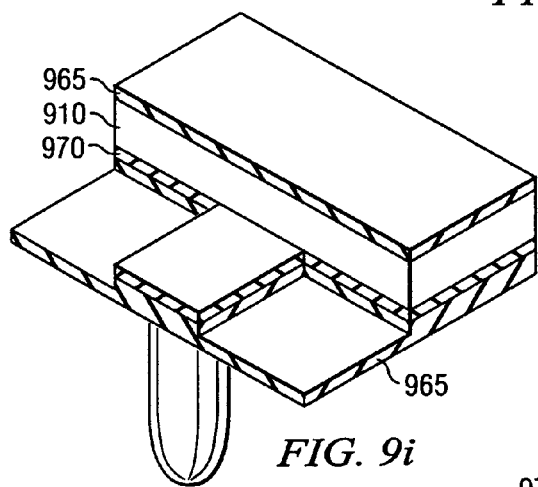
Figure 9J:
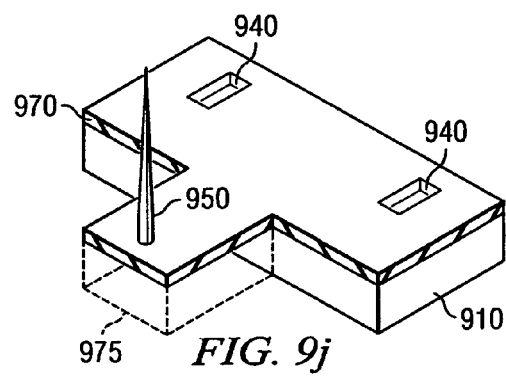

A layer of photoresist was spin cast onto the wafers and the pattern of the cantilever body 960 was exposed using a bright field mask. The thickness of this layer is important to the success of this example and should be at least equal to the height of the VACNF. For 10 µm tall VACNF, a 12 µm thick layer of Shipley SPR220-7.0 was used. This exposure was performed using a 5× reduction stepper and aligned such that the catalyst site 945 patterned in FIG. 9D was placed at the end of the cantilever body directly in substantially the center of the structure. Following post exposure baking of exposed wafers and development of the pattern in a 0.26 N aqueous developer (Shipley, CD-26), the pattern transfer was performed using a combination of RIE processes. First, the oxide protection layer 955 was etched until the Si surface of the wafer was exposed. This was followed by an etch of the Si layer 930 using an inductively coupled power (ICP) RIE process. This process has high selectivity to $SiO_2$ and photoresist and is capable of etching several-hundred nanometers of Si per minute with very anisotropic sidewall profiles. After verifying that the etch removed 10 µm of Si from the patterned areas (thickness of the $p^+$ layer) the remaining resist was stripped from the wafers using a combination of wet chemicals and ashing (the result of this sub-process is shown in FIG. 9G). The wafers were coated with a 200 nm thick layer 965 of $Si_3N_4$ using low pressure chemical vapor deposition. This layer will serve as an etch mask during the cantilever release etch process. The backside of the wafers were coated in a layer of photoresist and the exposure of the bottom side of the cantilever body 970 was performed using a bright field mask. A contact photolithography tool equipped with double-sided alignment capability was used to perform the exposure. Using the developed resist as a mask, the $Si_3N_4$ layer 965 on the backside of the wafer was patterned using an RIE process until it was completely removed from at least a portion of the bulk Si (the result of this sub-process is shown in FIG. 9H). The wafers were immersed in a heated solution of KOH and deionized (DI) water. This process etches Si along the (111) plane creating a sloped anisotropic profile. It is also highly selective to $Si_3N_4$ and $p^+$ Si. This allowed the etch process to terminate at the $Si_3N_4$ layer on the front side of the wafer without damaging the cantilever structure (the result of this sub-process is shown in FIG. 9I). The process was completed by removing the $Si_3N_4$ from the front of the wafers using RIE followed by the removal of the $SiO_2$ using a diluted HF solution (the result of this sub-process is shown in FIG. 9J). Referring to the FIG. 9J, a relieved volume 975 can be seen beneath the cantilever body 970.

Figure 12A:
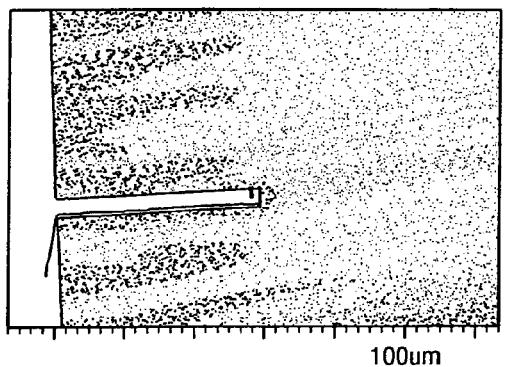
FIGS. 12A–12D illustrate scanning electron micrographs of a VACNF coupled to an end of a suspended cantilever structure, representing an embodiment of the invention.
Figure 12C:
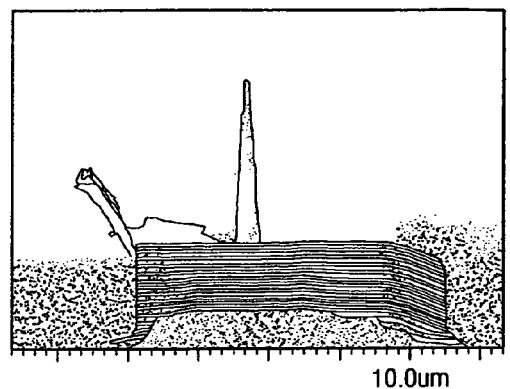
Figure 12B:
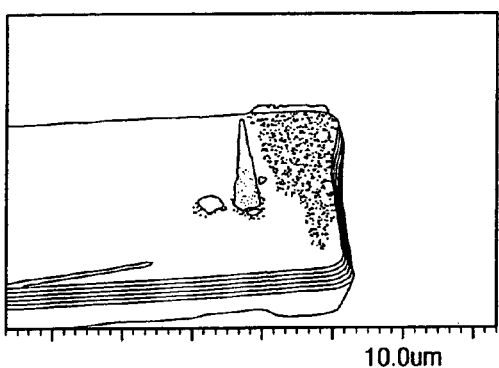
Figure 12D:
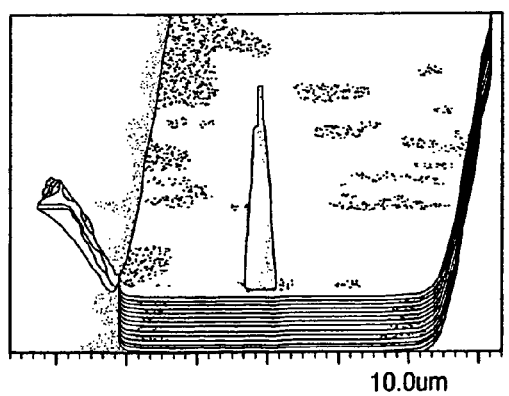

FIGS. 12A–12D show SEM images of completed VACNF-based high aspect ratio SPM tips. FIG. 12A is an image showing a VACNF at the end of a suspended cantilever structure. FIG. 12B is a higher magnification image of the VACNF shown in FIG. 12A. FIG. 12C is a cross-sectional view of a completed probe device. FIG. 12D is an oblique angle image of the probe shown in FIG. 12C.

Practical Applications of the Invention

The following practical applications of the invention relate to traditional SPM imaging modes where a single high aspect ratio tip is useful: atomic force microscopy (AFM), scanning tunneling microscopy (STM), magnetic force microscopy, chemical force microscopy, electrochemical microscopy, and electrical force microscopy; biological probes; delivery of macromolecular material to living cells, electrochemical sensing; SPM based nanolithography by mechanical means; SPM based nanolithography by electron emission from the VACNF probe tip, SPM based manipulation. The following practical applications of the invention related to novel applications where multiple electrically addressable high aspect ratio tips are of critical importance. These applications employ a cantilever structure with two or four individually addressable high aspect ratio VACNF tips grown on a single silicon nitride cantilevers. These structures may be fabricated using processes described in examples 3–6 above. Specifically, the invention can advantageously be used in the context of a VACNF four point probe for conductivity mapping applications, a VACNF two point probe for scanning spreading resistance measurements, and VACNF two or four point probe for electrochemical measurements. There are virtually innumerable uses for the invention, all of which need not be detailed here.

The terms a or an, as used herein, are defined as one or more than one. The term plurality, as used herein, is defined as two or more than two. The term another, as used herein, is defined as at least a second or more. The terms "comprising" (comprises, comprised), "including" (includes, included) and/or "having" (has, had), as used herein, are defined as open language (i.e., requiring what is thereafter recited, but open for the inclusion of unspecified procedure (s), structure(s) and/or ingredient(s) even in major amounts. The terms "consisting" (consists, consisted) and/or "composing" (composes, composed), as used herein, close the recited method, apparatus or composition to the inclusion of procedures, structure(s) and/or ingredient(s) other than those recited except for ancillaries, adjuncts and/or impurities ordinarily associated therewith. The recital of the term "essentially" along with the terms "consisting" or "composing" renders the recited method, apparatus and/or composition open only for the inclusion of unspecified procedure(s), structure(s) and/or ingredient(s) which do not materially affect the basic novel characteristics of the composition. The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

All the disclosed elements and features of each disclosed embodiment can be combined with, or substituted for, the disclosed elements and features of every other disclosed embodiment except where such elements or features are mutually exclusive. Variation may be made in the steps or in the sequence of steps composing methods described herein.

Although the cantilever structure described herein can be a separate module, it will be manifest that the cantilever structure may be integrated into the system with which it is (they are) associated. Specifically, the cantilever structure can be integrated with a scanning probe microscope tip and/or a chemical force microscope tip. Further, these tips can be integrated with a scanning probe microscope and/or a chemical force microscope. The individual components need not be formed in the disclosed shapes, or combined in the disclosed configurations, but could be provided in virtually any shapes, and/or combined in virtually all configurations.

The individual components need not be fabricated from the disclosed materials, but could be fabricated from virtually any suitable materials. Homologous replacements may be substituted for the substances described herein. Agents which are both chemically related may be substituted for the agents described herein where the same or similar results would be achieved.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1. "Scanning tunneling microscopy on rough surfaces: tip-shape-limited resolution" G. Reiss, J. Vancea, H. Wittmann, J. Zweck, and H. Hoffmann, J. Appl. Phys. 67, 1156 (1990)
2. "Scanning probe metrology" J. E. Griffith, D. A. Grigg, M. J. Vasile, P. E. Russell, and E. A. Fitzgerald J. Vac. Sci. Technol. A 10, 674 (1992)
3. "Characterization of scanning probe microscope tips for linewidth measurement" J. E. Griffith, D. A. Grigg, M. J. Vasile, P. E. Russell, and E. A. Fitzgerald, J. Vac. Sci. Technol. B 9, 3586 (1991)
4. "Scanning probe tip geometry optimized for metrology by focused ion beam ion milling" M. J. Vasile, D. Grigg, J. E. Griffith, E. Fitzgerald, and P. E. Russell J. Vac. Sci. Technol. B, 9, 3569 (1991)
5. "Scanning probe tips formed by focused ion beams" M. J. Vasile, D. A. Grigg, J. E. Griffith, E. A. Fitzgerald, and P. E. Russell, Rev. Sci. Instrum., 62, 2167 (1991)
6. "Formation of probe microscope tips in silicon by focused ion beams" M. J. Vasile, C. Biddick and H. Huggins. Appl. Phys. Lett., 64, 575 (1994)
7. "New scanning tunneling microscopy tip for measuring surface topography" Y. Akama, E. Nishimura, A. Sakai, and H. Murakami, J. Vac. Sci and Technol. B 8, 429 (1990)
8. "Sharpened electron beam deposited tips for high resolution atomic force microscope lithography and imaging" M. Wendel, H. Lorenz and J. P. Kotthaus, Appl/Phys. Lett. 67, 3732 (1995)
9. "Mechanical properties of high-aspect-ratio atomic force microscope tips" G. Janchen, P. Hoffmann, A. Kriele, H. Lorenz, A. J. Kulik, and G. Dietler, Appl. Phys. Lett., 80, 4623 (2002)
10. "Nanotubes as nanoprobes in scanning probe microscopy" H. Dai, J. H. Hafner, A. G. Rinzler, D. T. Colbert and R. E. Smalley, Nature 384, 147 (1996)
11. "Nanobeam mechanics: Elasticity, Strength and Toughness of Nanorods and Nanotubes" E. W. Wong, P. E. Sheehan, C. M. Lieber, Science 277, 1971 (1997)
12. "Exploiting the properties of carbon nanotubes for nanolithography" H. Dai, N. Franklin, J. Han, Appl. Phys. Lett. 71, 1508 (1998)
13. "Growth of nanotubes for probe microscopy" J. H. Hafner, C. L. Cheung, C. M. Lieber, Nature, 398, 762 (1999)
14. "Carbon-nanotube tips for scanning probe microscopy: Preparation by a controlled process and observation of deoxyribonucleic acid" H. Nishijima, S. Kamo, S. Akita, Y. Nakayama, K. I. Hohmura, S. H. Yoshimura and K. Takeyasu, Appl. Phys. Lett. 74, 4061 (1999)
15. "Direct Growth of Single-Walled Carbon nanotube Scanning Probe Microscopy Tips", J. H. Hafner, C. L. Cheung, C. M. Lieber, J. Am Chem. Soc. 121, 9750 (1999)
16. "$WS_2$ nanotubes as tips in scanning probe microscopy" A. Rothschild, S. R. Cohen, R. Tenne, Appl. Phys. Lett. 75, 4025 (1999)
17. "Microprocesses for fabricating carbon-nanotube probes of a scanning probe microscope" S. Kamo, Y. Nakayama, S. Akita, H. Nishijima, K. I. Hohmura, S. H. Yoshimura and K. Takeyasu J. Vac. Sci. and Technol. B, 18, 661 (2000)
18. "Growth and fabrication with single-walled carbon nanotube probe microscopy tips" C. L. Cheung, J. H. Hafner, T. W. Odom, K. Kim and C. M. Lieber, Appl. Phys. Lett, 76, 3136 (2000)
19. "Improved fabrication approach for carbon nanotube probe devices" R. Stevens, C. Nguyen, A. Cassel, L. Delzeit, M. Meyyappan and J. Han, Appl. Phys. Lett, 77, 3453 (2000)
20. "Carbon nanotube tip probes: stability and lateral resolution in scanning probe microscopy and application to surface science in semiconductors" C. V. Nguyen, K. J. Chao, R. M. D. Stevens, L. Delzeit and M. Meyyappan. Nanotechnology, 12, 363 (2001)
21. "Wafer scale production of carbon nanotube scanning probe tips for atomic force microscopy" E. Yenilmez, Q. Wang, R. J. Chen, D. Wang, and H. Dai, 80, 2225 (2002)
22. "Single-wall carbon nanotube atomic force microscope probes" E. S. Snow, P. M. Campbell and J. P. Novak, Appl. Phys. Lett. 80, 2002 (2002)
23. "Catalytic growth of carbon filaments" R. T. K. Baker, Carbon, 27, 315 (1989)
24. Chen, Y., Z. L. Wang, J. S. Yin, D. J. Johnson and R. H. Prince (1997). "Well-aligned graphitic nanofibers synthesized by plasma-assisted chemical vapor deposition." Chemical Physics Letters 272 (3–4): 178–182.
25. "Patterned growth of individual and multiple vertically aligned carbon nanofibers" V. I. Merkulov, D. H. Lowndes, Y. Y. Wei, G. Eres, and E. Voelkl, Appl. Phys. Lett., 76, 3555 (2000)

26. "Shaping carbon nanostructures by controlling the synthesis process" V. I. Merkulov, M. A. Guillorn, D. H. Lowndes, M. L. Simpson, and E. Voelkl, Appl. Phys. Lett., 79, 1178 (2001)
27. U.S. Pat. No. 6,649,431, issued Nov. 18, 2003 entitled "Method for mass production of carbon tips with cylinder-on-cone shape" to V. I. Merkulov, D. H. Lowndes, M. A. Guillorn, and M. L. Simpson
28. "Sharpening of carbon nanocone tips during the synthesis process" V. I. Merkulov, A. V. Melechko, M. A. Guillorn, D. H. Lowndes, and M. L. Simpson, Chem. Phys. Lett., 350, 381 (2001)
29. "Controlled alignment of carbon nanofibers in a large-scale synthesis process" V. I. Merkulov, A. V. Melechko, M. A. Guillorn, D. H. Lowndes, and M. L. Simpson, Appl. Phys. Lett. 80, 4816 (2002)
30. U.S. Ser. No. 10/068,795, filed Feb. 6, 2002, publication number 20030148577A1, publication date Aug. 7, 2003 (PCT/U.S.03/03387, filed Feb. 5, 2003) entitled "Controlled alignment of catalytically grown nanostructures in a large-scale synthesis process" by V. I. Merkulov, A. V. Melechko, M. A. Guillorn, D. H. Lowndes, and M. L. Simpson
31. "Microfabricated field emission devices using carbon nanofibers as cathode elements" M. A. Guillorn, A. V. Melechko, L. R. Baylor, V. 1. Merkulov, E. D. Ellis, G. J. Bordonaro, M. L. Simpson and D. H. Lowndes, J. Vac. Sci. Technol. B 19, 2598 (2001)
32. "Self-aligned gated field emission devices using single carbon nanofiber cathodes" M. A. Guillorn, A. V. Melechko, V. I. Merkulov, D. K. Hensley, M. L. Simpson, and D. H. Lowndes, Appl. Phys. Lett. 81, 3660 (2002)
33. "Individually addressable vertically aligned carbon nanofiber-based electrochemical probes" M. A. Guillorn, A. V. Melechko, T. E. McKnight, D. W. Austin, V. I. Merkulov, M. L. Simpson and D. H. Lowndes, J. Appl. Phys. 91, 3824 (2002)
34. U.S. Ser. No. 10/408,294, filed Apr. 7, 2003 entitled "Parallel Macromolecular Delivery and Biochemical/Electromchemical Interface to Whole Cells Employing Carbon Nanofibers" by T. E. McKnight, A. V. Melechko, G. D. Griffin, M. A. Guillorn, V. L. Merkulov and M. L. Simpson

What is claimed is:

1. An apparatus, comprising a cantilever structure including:
   a substrate including a cantilever body that includes a doped layer; and
   a substantially vertically aligned, with respect to a plane of the cantilever body, elongated nanostructure coupled to the cantilever body,
   wherein the substantially vertically aligned elongated nanostructure is directed out of the plane of the substrate.
2. The apparatus of claim 1, further comprising another substantially vertically aligned nanostructure coupled to the cantilever body.
3. The apparatus of claim 1, wherein there are no other substantially vertically aligned nanostructures coupled to the cantilever body.
4. The apparatus of claim 1, wherein the substantially vertically aligned nanostructure is coupled to the cantilever body at a photolithographically defined location.
5. The apparatus of claim 1, wherein the substantially vertically aligned nanostructure is located toward an end of the cantilever body and substantially on a longitudinal center line of the cantilever body.
6. The apparatus of claim 1, wherein the substantially vertically aligned nanostructure includes a carbon nanofiber.
7. The apparatus of claim 1, wherein the substantially vertically aligned nanostructure includes a single wall carbon nanotube.
8. The apparatus of claim 1, wherein the substantially vertically aligned nanostructure includes a multi-wall carbon nanotube.
9. The apparatus of claim 1, wherein the substantially vertically aligned nanostructure includes an expanded base and a substantially cylindrical nanostructure coupled to the expanded base.
10. The apparatus of claim 1, further comprising a nanostructure deactivating layer that substantially surrounds a portion of the substantially vertically aligned nanostructure.
11. The apparatus of claim 10, where in the nanostructure deactivating layer includes $Si_3N_4$.
12. The apparatus of claim 1, further comprising an electrically conducting layer coupled between the substantially vertically aligned nanostructure and the doped layer of the cantilever body.
13. The apparatus of claim 12, wherein the electrically conducting layer includes an electrical interconnect to the substantially vertically aligned nanostructure.
14. The apparatus of claim 1, wherein the doped layer is degeneratively doped to a metallic state.
15. The apparatus of claim 1, wherein the substantially vertically aligned nanostructure is hydrophobic.
16. The apparatus of claim 1, wherein the substantially vertically aligned nanostructure is hydrophilic.
17. The apparatus of claim 1, wherein a tip region of the substantially vertically aligned nanostructure is chemically modified.
18. A chemical force microscope tip comprising the apparatus of claim 1.
19. A chemical force microscope comprising the chemical force microscope tip of claim 18.
20. A scanning probe microscope tip comprising the apparatus of claim 1.
21. A scanning probe microscope comprising the scanning probe microscope tip of claim 20.
22. A magnetic force microscope tip comprising the apparatus of claim 1.
23. A magnetic force microscope comprising the magnetic force microscope tip of claim 22.
24. An apparatus, comprising a cantilever structure including:
   a substrate including a cantilever body; and
   a substantially vertically aligned, with respect to a plane of the cantilever body, elongated nanostructure coupled to the cantilever body.
25. The apparatus of claim 24, further comprising another substantially vertically aligned nanostructure coupled to the cantilever body.
26. The apparatus of claim 24, wherein there are no other substantially vertically aligned nanostructures coupled to the cantilever body.
27. The apparatus of claim 24, wherein the substantially vertically aligned nanostructure is coupled to the cantilever body at a photolithographically defined location.
28. The apparatus of claim 24, wherein the substantially vertically aligned nanostructure is located toward an end of the cantilever body and substantially on a longitudinal center line of the cantilever body.
29. The apparatus of claim 24, wherein the substantially vertically aligned nanostructure includes a carbon nanofiber.

30. The apparatus of claim 24, wherein the substantially vertically aligned nanostructure includes a single wall carbon nanotube.

31. The apparatus of claim 24, wherein the substantially vertically aligned nanostructure includes a multi-wall carbon nanotube.

32. The apparatus of claim 24, wherein the substantially vertically aligned nanostructure includes an expanded base and a substantially cylindrical nanostructure coupled to the expanded base.

33. The apparatus of claim 24, further comprising a nanostructure deactivating layer that substantially surrounds a portion of the substantially vertically aligned nanostructure.

34. The apparatus of claim 33, where in the nanostructure deactivating layer includes $Si_3N_4$.

35. The apparatus of claim 24, further comprising an electrically conducting layer coupled between the substantially vertically aligned nanostructure and the cantilever body.

36. The apparatus of claim 35, wherein the electrically conducting layer includes an electrical interconnect to the substantially vertically aligned nanostructure.

37. The apparatus of claim 24, wherein the cantilever body includes an etch stop layer.

38. The apparatus of claim 24, wherein the substrate includes a doped layer that is degeneratively doped to a metallic state.

39. The apparatus of claim 24, wherein the substantially vertically aligned nanostructure is hydrophobic.

40. The apparatus of claim 24, wherein the substantially vertically aligned nanostructure is hydrophilic.

41. The apparatus of claim 24, wherein a tip region of the substantially vertically aligned nanostructure is chemically modified.

42. A chemical force microscope tip comprising the apparatus of claim 24.

43. A chemical force microscope comprising the chemical force microscope tip of claim 42.

44. A scanning probe microscope tip comprising the apparatus of claim 24.

45. A scanning probe microscope comprising the scanning probe microscope tip of claim 44.

46. A magnetic force microscope tip comprising the apparatus of claim 24.

47. A magnetic force microscope comprising the magnetic force microscope tip of claim 46.

* * * * *